(12) United States Patent
Bertsch et al.

(10) Patent No.: US 11,586,671 B2
(45) Date of Patent: Feb. 21, 2023

(54) MANUFACTURE OF NFTS FROM FILM LIBRARIES

(71) Applicant: Eight Plus Ventures, LLC, Santa Monica, CA (US)

(72) Inventors: Christoph Bertsch, Pacific Palisades, CA (US); Rodney Lake, Santa Monica, CA (US); Douglas Sturgeon, Half Moon Bay, CA (US); Anthony Sziklai, Oak Park, CA (US)

(73) Assignee: Eight Plus Ventures, LLC, Santa Monica, CA (US)

( * ) Notice: Subject to any disclaimer, the term of this patent is extended or adjusted under 35 U.S.C. 154(b) by 0 days.

(21) Appl. No.: 17/684,150

(22) Filed: Mar. 1, 2022

(65) Prior Publication Data
US 2022/0188354 A1 Jun. 16, 2022

Related U.S. Application Data

(63) Continuation of application No. 17/670,654, filed on Feb. 14, 2022, which is a continuation of application No. 16/799,588, filed on Feb. 24, 2020, which is a continuation of application No. 16/355,576, filed on Mar. 15, 2019, now Pat. No. 10,606,888, which is a continuation-in-part of application No. 16/110,831, filed on Aug. 23, 2018, now Pat. No. 10,296,729, and
(Continued)

(51) Int. Cl.
| | | |
|---|---|---|
| G06F 21/16 | (2013.01) | |
| G06F 16/783 | (2019.01) | |
| H04N 1/00 | (2006.01) | |
| H04L 9/06 | (2006.01) | |
| G06F 16/78 | (2019.01) | |
| G06V 20/40 | (2022.01) | |

(52) U.S. Cl.
CPC ........ *G06F 16/784* (2019.01); *G06F 16/7834* (2019.01); *G06F 16/7867* (2019.01); *G06V 20/46* (2022.01); *H04L 9/0637* (2013.01); *H04L 9/0643* (2013.01); *H04N 1/00188* (2013.01)

(58) Field of Classification Search
USPC ...................................................... 380/201
See application file for complete search history.

(56) References Cited

U.S. PATENT DOCUMENTS

| | | |
|---|---|---|
| 6,657,702 B1 | 12/2003 | Chui |
| 7,209,571 B2 | 4/2007 | Davis et al. |

(Continued)

OTHER PUBLICATIONS

Cryptoart, "Cryptoart is like a piggy bank. Each art piece physically stores Bitcoin. Each art piece also includes an easy 3-step guide to understanding Bitcoin", online article, https://cryptoart.com/how-cryptoart-works/, last accessed Jul. 25, 2018, 3 pages.
(Continued)

*Primary Examiner* — Nigar Chowdhury
(74) *Attorney, Agent, or Firm* — SoCal IP Law Group LLP; Steven C. Sereboff

(57) ABSTRACT

Methods and processes for manufacture of an image product from a digital image. An object in the digital image is detected and recognized. Object metadata is assigned to the object, the object metadata linking sound to the object in the digital image which produced the sound. At least one cryptographic hash of the object metadata is generated, and the hash is written to a node of a transaction processing network.

20 Claims, 29 Drawing Sheets

Related U.S. Application Data a continuation-in-part of application No. 16/027,068, filed on Jul. 3, 2018, now Pat. No. 10,256,829, and a continuation-in-part of application No. 16/017,876, filed on Jun. 25, 2018, now Pat. No. 10,325,156, and a continuation-in-part of application No. 16/000,410, filed on Jun. 5, 2018, now Pat. No. 10,289,915.

(56) References Cited

U.S. PATENT DOCUMENTS

| | | | |
|---|---|---|---|
| 7,668,869 | B2 | 2/2010 | Weinberger |
| 8,494,231 | B2 | 7/2013 | Folta |
| 9,049,134 | B2 | 6/2015 | Liao et al. |
| 9,690,967 | B1 | 6/2017 | Brundage et al. |
| 10,142,381 | B2 | 11/2018 | Nathan |
| 10,256,829 | B1 | 4/2019 | Bertsch |
| 10,325,156 | B1 | 6/2019 | Bertsch |
| 10,361,866 | B1 | 7/2019 | McGregor et al. |
| 2002/0012445 | A1 | 1/2002 | Perry |
| 2002/0146123 | A1 | 10/2002 | Tian et al. |
| 2004/0153649 | A1 | 8/2004 | Rohads et al. |
| 2004/0201751 | A1 | 10/2004 | Bell |
| 2005/0010792 | A1 | 1/2005 | Carpentier et al. |
| 2005/0069171 | A1 | 3/2005 | Rhoads et al. |
| 2006/0103736 | A1 | 5/2006 | Obrador |
| 2006/0130118 | A1 | 5/2006 | Damm |
| 2006/0251338 | A1 | 11/2006 | Gokturk |
| 2007/0061895 | A1 | 3/2007 | Ceraolo et al. |
| 2007/0165253 | A1 | 7/2007 | Usui |
| 2008/0049971 | A1 | 2/2008 | Ramos et al. |
| 2008/0127270 | A1 | 5/2008 | Shipman et al. |
| 2008/0228733 | A1 | 9/2008 | Davis et al. |
| 2008/0243898 | A1 | 10/2008 | Gormish |
| 2009/0024587 | A1* | 1/2009 | Kamani ............... G06F 16/33 |
| 2009/0024650 | A1* | 1/2009 | Kamani ............... G06F 16/90 |
| | | | 707/999.102 |
| 2009/0074304 | A1 | 3/2009 | Momosaki |
| 2009/0141932 | A1 | 6/2009 | Jones |
| 2010/0059380 | A1 | 3/2010 | Rohads et al. |
| 2010/0074590 | A1 | 3/2010 | Momosaki |
| 2010/0080471 | A1 | 4/2010 | Haas et al. |
| 2010/0309226 | A1 | 12/2010 | Quack |
| 2012/0106806 | A1 | 5/2012 | Folta et al. |
| 2013/0003126 | A1 | 1/2013 | Van Osdol et al. |
| 2013/0061040 | A1 | 3/2013 | Kiefer et al. |
| 2013/0174268 | A1 | 7/2013 | Wang et al. |
| 2014/0049653 | A1 | 2/2014 | Leonard et al. |
| 2014/0214885 | A1 | 7/2014 | Park |
| 2014/0331137 | A1 | 11/2014 | McKoen |
| 2015/0100578 | A1 | 4/2015 | Rosen et al. |
| 2015/0172787 | A1 | 6/2015 | Geramifard |
| 2015/0178786 | A1 | 6/2015 | Claessens |
| 2016/0285631 | A1 | 9/2016 | Deleeuw |
| 2016/0342937 | A1 | 11/2016 | Kerrick |
| 2016/0379330 | A1 | 12/2016 | Powers |
| 2016/0380937 | A1 | 12/2016 | Murphy et al. |
| 2017/0060776 | A1 | 3/2017 | Shimonek et al. |
| 2017/0140346 | A1 | 5/2017 | Whitehouse |
| 2017/0243179 | A1 | 8/2017 | Dehaeck |
| 2018/0046889 | A1 | 2/2018 | Kapinos et al. |
| 2018/0082074 | A1 | 3/2018 | Nunes et al. |
| 2018/0121635 | A1 | 5/2018 | Tormasov et al. |
| 2018/0136633 | A1 | 5/2018 | Small |
| 2018/0253567 | A1 | 9/2018 | Gonzalez-Banos et al. |
| 2018/0257306 | A1 | 9/2018 | Mattingly et al. |
| 2018/0261307 | A1 | 9/2018 | Couse |
| 2018/0278423 | A1 | 9/2018 | Bianzino |
| 2019/0045207 | A1 | 2/2019 | Chen |

OTHER PUBLICATIONS

R.A.R.E., A new age platform for collecting unique, scarce digital art, cultivating the next generation of artists and collectors, https://www.rareart.io/#How-RARE-Works, last accessed Jul. 25, 2018, 6 pages.

Ando et al. Image Recognition Based Digital Watermarking Technology for Item Retrieval in Convenience Stores, journal, Feature Articles: Creating New Services with corevo-NTT Group's Artificial intelligence Technology, vol. 15 No. 8, published Aug. 2017, 6 pages.

World Intellectual Property Organization, International Search Report and Written Opinion, for International Application No. PCT/US2019/043671, dated Sep. 4, 2019, 3 total pages.

World Intellectual Property Organization, International Search Report and Written Opinion, for International Application No. PCT/US2019/043676, dated Sep. 9, 2019, 8 total pages.

World Intellectual Property Organization, International Search Report and Written Opinion, for International Application No. PCT/US2019/035869, dated Jul. 17, 2019, 10 total pages.

World Intellectual Property Organization International Search Report and Written Opinionfor International Application No. PCT/US2019/036061, dated Oct. 7, 2019, 8 total pages.

Bhowmik et al.The Multimedia Blockchain: A Distributed and Tamper-Proof Media Transaction Frame word2017 22nd International Conference on Digital Signal Processing (DSP), London, 2017, pp. 1-5 (IEE Nov. 7, 2017).

Kerr et al.A Blockchain Implementation for the Cataloguing of CCTV Video Evidence2018 15th IEEE International Conference on Advanced Video and Signal Based Surveillance (AVSS), Auckland, New Zealand, 2018, pp. 1-6 (IEEE Nov. 30, 2018).

* cited by examiner

MANUFACTURE OF NFTS FROM FILM LIBRARIES

RELATED APPLICATION INFORMATION

This patent is a continuation of U.S. application Ser. No. 17/670,654 filed Feb. 14, 2022, which is a continuation of U.S. application Ser. No. 16/799,588 filed Feb. 24, 2020, which is a continuation of U.S. application Ser. No. 16/355,576 filed Mar. 15, 2019, now U.S. Pat. No. 10,606,888, which is a continuation-in-part of and claims priority to the following prior-filed non-provisional patent applications: U.S. application Ser. No. 16/017,876 filed Jun. 25, 2018, now U.S. Pat. No. 10,325,156; U.S. application Ser. No. 16/000,410 filed Jun. 5, 2018, now U.S. Pat. No. 10,289,915; U.S. application Ser. No. 16/027,068 filed Jul. 3, 2018, now U.S. Pat. No. 10,256,829; and U.S. application Ser. No. 16/110,831 filed Aug. 23, 2018, now U.S. Pat. No. 10,296,729, all of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to digital image processing, and more particularly to production of physical prints from digital images.

Description of the Related Art

A movie is a collection of still images that are shown one after the other in quick succession. When the images are viewed in quick succession (approximately 24 images per second), the human brain interprets the images as a motion picture or movie. Therefore, a traditional movie that is shown in theaters is a display of images in quick succession on the order of approximately 24 images per second, or 129,600 images for a 90-minute movie (24 images per second×60 seconds per minute×90 minutes). Movies made in non-digital (e.g., photographic film) media can be converted to digital format, and the converted movies as well as movies originally made in digital format can have individual images extracted from the master digital media file. Physical (e.g., hard copy) prints can be made from the still images. Artificial intelligence technology is applied to the content of the master digital media file to improve the exposure of individual images, whereby the principles of sensitometry are used in training the artificial intelligence algorithms that are applied to improve the image exposure. Upon completion of the process of improvement of image exposure, a filter can be applied to convert the individual images to a desired format (such as where a sepia filter is applied to convert black and white or color images to a sepia and white format). Artificial intelligence technology is applied to the content of the master digital media file to convert monochromatic (such as black and white) source images into color-converted images The improved and converted images can be assembled into a new, derivative movie work through linking the individual images into a movie, using the image numbering metadata to place each image in its respective order (e.g. image 2 follows image 1 and precedes image 3 and so on) in a new, derivative digital media file. High-resolution (e.g., Ultra-High Definition (3840×2160 pixels) or higher) video display technology enables the display of images with details such as texture (e.g., linen versus smooth and fine-grained woods) that are not possible with lower resolution (e.g., 1920×1080 pixels).

Throughout this description, elements appearing in figures are assigned three-digit or four-digit reference designators, where the most significant digit(s) are the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
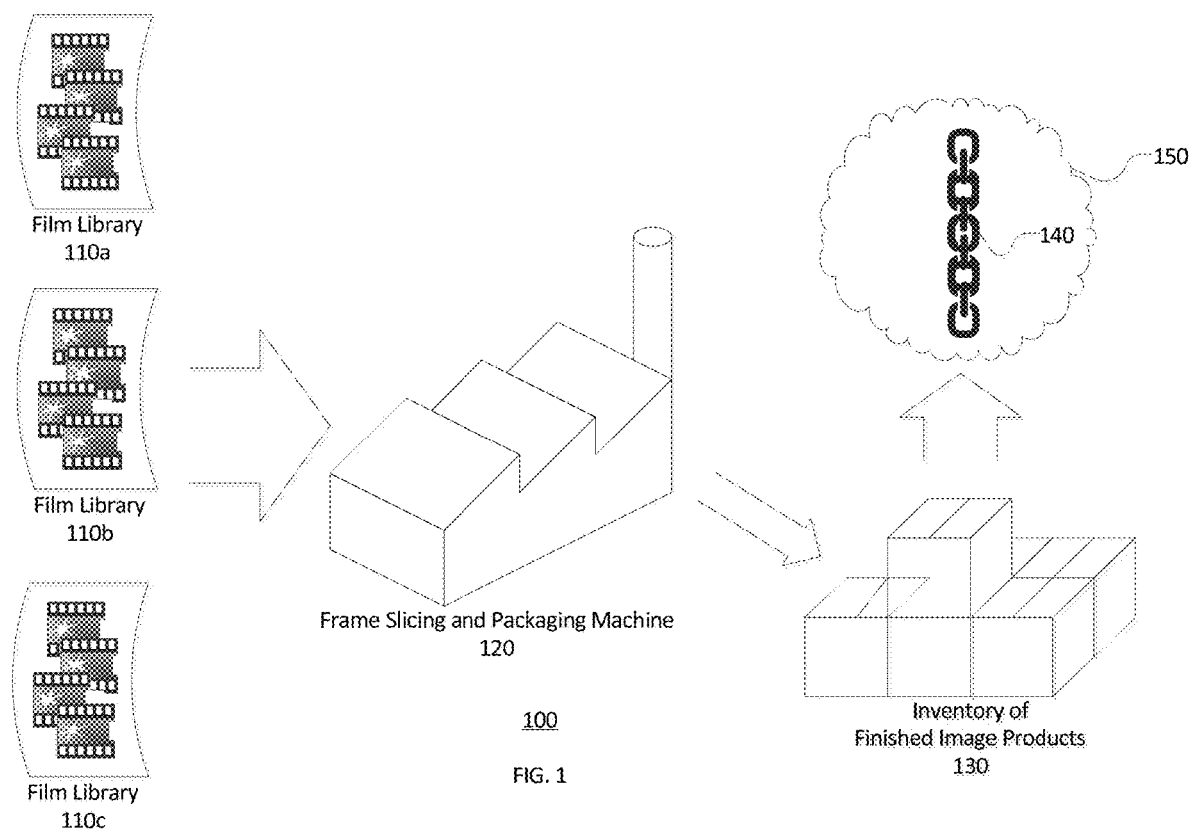
FIG. 1 is a block diagram of a system for production of image inventories.

Referring now to FIG. 1 there is shown a block diagram of a system 100 for production of image inventories. The system 100 includes one or more film libraries 110a, 110b, 110c, a frame slicing and packaging machine 120, an inventory of finished image products 130, and transaction processing nodes 140.

The film libraries 110a, 110b, 110c each include a collection of one or more whole movies, videos, and/or movie trailers, and/or portions thereof (e.g., clips), each of which is a sequence of frames having a respective still image. These items in a film library will be referred to herein as base works. A base work may be a single frame, i.e., a still image, such as a picture or a drawing, in analog or digital format. The base works may be in analog or digital format, and each film library 110a, 110b, 110c may be exclusive to a particular form or format of base work. Some film libraries may have base works in assorted forms and/or formats, related or unrelated. The frames of a base work may have various objects, such as people, animals, goods physical structures or text in a frame. A given frame may include audio and subtitles.

Figure 2:
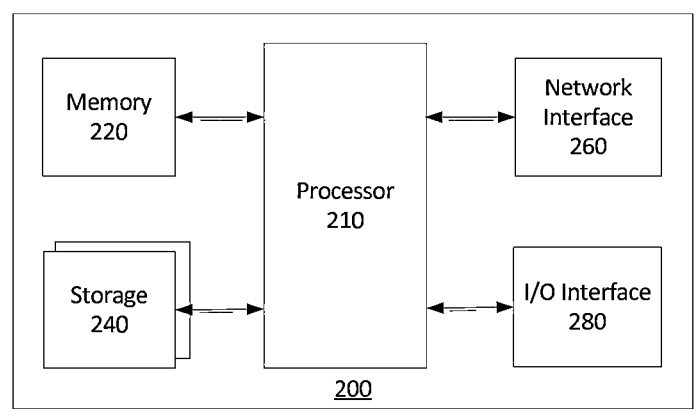
FIG. 2 is a block diagram of a computing device.
Figure 4:
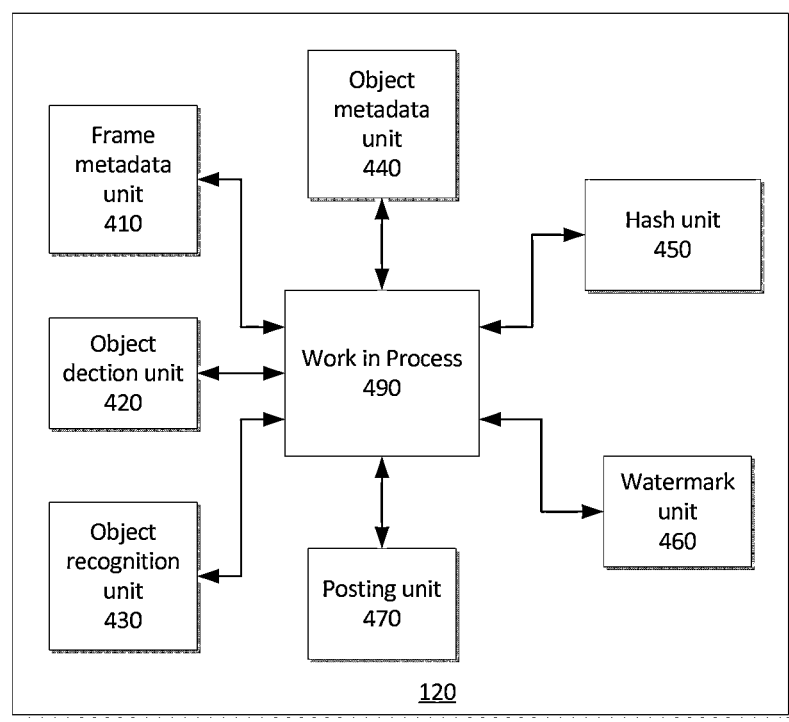
FIG. 4 is a block diagram of a frame slicing and packaging machine.

The frame slicing and packaging machine 120 produces the inventory of finished image products 130 and moves them into the transaction processing nodes 140. The frame slicing and packaging machine 120 may be a computer system, such as shown in FIG. 2, including one or more non-volatile machine-readable media storing a program having instructions which when executed by a processor will cause the processor to produce the inventory of finished image products 130. As shown in FIG. 4, the frame slicing and packaging machine 120 may include a frame metadata unit 410, an object detection unit 420, an object recognition unit 430, an object metadata unit 440, a hash unit 450, a watermark unit 460, and a posting unit 470. These units 410, 420, 430, 440, 450, 460, 470 interact with a work in process subsystem 490, which may be storage 240 (FIG. 2). The posting unit 470 may effectuate its work through I/O interface 280 (FIG. 2).

Artificial intelligence may be incorporated into or used by the frame metadata unit 410, the object detection unit 420, the object recognition unit 430 and /or the object metadata unit 440. Accordingly, these units 410, 420, 430, 440 may be trained to perform the corresponding work prior to going into production. These units 410, 420, 430, 440 may employ quality assurance, such as use of human checks on samples of the production output, which may be used as feedback for refinement of the training.

Each finished image product in the inventory 130 is a chattel good, capable of transfer on an individual basis.

The transaction processing nodes 140 may be in an information technology cloud 150, such as cloud storage. The transaction processing nodes may be in a blockchain.

Description of Processes

Figure 3:
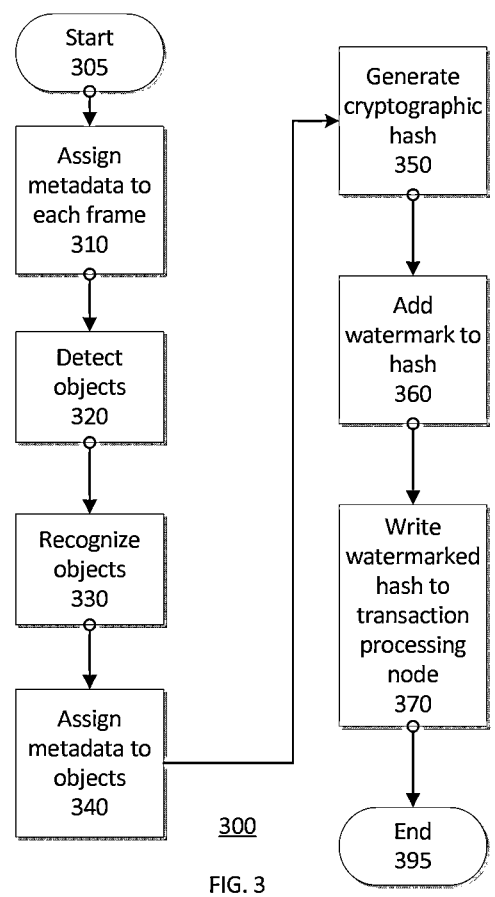
FIG. 3 is a flowchart of a process for production of image inventories.

Referring now to FIG. 3 there is shown a flowchart 300 of a process for production of image inventories. The process 300 may be performed by the frame slicing and packaging machine 120 of FIG. 1 and FIG. 4, having as inputs the film libraries 110a, 110b, 110c, etc. and manufacturing the inventory of finished image products 130. The flow chart 300 has both a start 305 and an end 395, but the process is cyclical in nature.

After starting 305, the process may include some preprocessing. This preprocessing may include extraction of base works from the film libraries into the work in process subsystem 490, and extraction of frames from a base work. The base work may be on an analog physical medium such as celluloid film, and preprocessing may include scanning the analog film medium into a digital file. If the base work is in analog form it may be converted to digital form. Preprocessing results in the base work, in digital form, being stored in the work in process subsystem 490.

During preprocessing, a human operator may select which frames should be included or excluded from further processing by the frame slicing and packaging machine 120. Frame selection criteria may include metadata as described below. The operator may be provided with options for frame selection, such as actors. For example, if the film Butch Cassidy and the Sundance Kid was being preprocessed, the operator could choose to process only the frames having video and/or audio of Butch Cassidy (played by Paul Newman), or only the frames showing his face.

Next, metadata is assigned to each frame of the digital video work (step 310). This may be performed by the frame metadata unit 410. The frame metadata may include an identification of the work, provenance of the work, an identification of the processor, and an identification of the frame within the work. The metadata may include: colors in the frame; tags previously assigned to the frame that describe the frame; and geographic location represented in the frame. The provenance of the work may include: the identity of the frame slicing and packaging machine; the geographic location and timestamp where the frame was originally produced or subsequently processed; names or other identification of the people, equipment and firms which did the production and processing; language and subtitles; details of how the production and processing were performed; and details of errors and errata from the production and processing. Metadata for a given frame may include a sequence of images from immediate prior and or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for frames of video may include: frame number in the overall frame count for the movie, segment, video, video clip, or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; and studio.

Metadata for frames of still images may include: title or identity of the collection or sub-collection of which the image is a part; artist; subject; category; album; session; sequence; session index; sequence index; camera used; and number of photographs in the album, session and or sequence.

Next, objects in each frame are detected (step 320). This may be performed by the object detection unit 420. The object detection step may include differentiation from a series of frames, for example using a Kalman filter on the images to recognize objects in motion.

Next, the detected objects are recognized (step 330). This may be performed by the object recognition unit 430. These objects may be recognizable generically or with varying specificity. For example, an object may be recognized generically as a person, or as a specific type of person (e.g., adult, child, male, female, star actor, extra), or as a specific person (e.g., Mae West or John F. Kennedy). Recognition of audio objects may include speech to text conversion. Frames may include text objects, such as signs or labels in an image.

Next, metadata is assigned to the recognized objects (step 340). This may be performed by the object metadata unit 440. This metadata may include the location in the frame of the object and recognition of the object (i.e., identification of what the object is). Location of the object in the frame may be, for example, X-Y coordinates, whether the object is in the frame's video or audio, bounding box coordinates (e.g., x0, y0, width, height), or foreground/background. The metadata may include an image of the object (e.g., an actor). The metadata of a person may include the actor's name. The metadata for audio objects may include spoken lines and sounds.

The metadata may link objects from within frames or across frames. For example, audio may be linked to the object in the image which produces the audio. In this way lines of dialogue may be linked to the actor speaking the lines. For example, in Gone with the Wind, Rhett Butler (played by Clark Gable) may be linked to the line, "Frankly, my dear, I don't give a damn." Likewise, recitations of "May the Force be with you" in a Star Wars film may be linked to each actor reciting this line. The sound of a gunshot may be linked to the image of the gun, or to a person struck, such as in the movie The Matrix, when Neo (played by Keanu Reeves) is shot.

Additional frame or object metadata may include: whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Arizona, appearing in the frame; popular or famous objects, such as the Millennium Falcon, appearing in the frame; desired color composition appearing in the frame; quality of preservation or original source media, such as whether it is deteriorated or is damaged; pre-existing value of adjacent segments or frames.

Next, for each frame, a cryptographic hash is generated of the frame's image, the frame metadata, and the object metadata (step 350). This may be performed by the hash unit 450, which encrypts information items about a frame along with the frame itself into a hash value that uniquely identifies the frame and information items about the frame. Thus, if even a single digital bit is changed in the files of the frame and information items about the frame that are input into the cryptographic hashing algorithm, the resulting hash value will be completely different from the hash value before the digital bit was changed. The hash unit 450 may produce a hash value from the representation of the image file along with the frame and object metadata. This hash value is more efficient and technologically superior to prior art index prints which aim to confirm that an individual print is part of a collection of prints shown in the index print.

The cryptographic hashing of the image from a frame with the metadata is performed to be able to objectively and transparently confirm authenticity of the image and the metadata into the future. This allows reliable chain of title and chain of custody, and can support a reliable market for the image.

Next a watermark may be added to the hash (step 360) to protect the linkage of the image file with its hashed value from malicious tampering. This may be performed by the watermark unit 460. The watermark unit 460 packages the hash value with the corresponding frame.

Next, the watermarked hash is written to a node of a transaction processing network (step 370). This may be performed by the posting unit 470 by generating a transaction to register the watermarked hash along with its record provenance into a blockchain. Writing to the node may be under control of a smart contract. The hash values provided by the hash unit 450, or the packages from the watermark unit 460, are recorded by the posting unit 470 into the transaction processing nodes 140, which may be in a secure transaction processing network, distributed ledger or blockchain, or other transaction processing environment. The distributed ledger may be an immutable distributed ledger.

The transaction processing nodes may support queries. Thus, an individual who might want to purchase an image could make a query to confirm the authenticity of the image. Each frame will have a different hash value—even hashes of the same frame will have different hash values.

FIG. 2 is a block diagram of a computing device 200. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 200 may be representative of the frame slicing and packaging machine 120 (FIG. 1). The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 220, storage 240, a network interface 260 and an I/O interface 280. The processor 210 may be or include one or more microprocessors, field programmable gate arrays (FPGAs), application specific integrated circuits (ASICs), programmable logic devices (PLDs) and programmable logic arrays (PLAs).

The memory 220 is a non-transitory storage medium and may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210. As used herein the term memory corresponds to the memory 220 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 240 provides non-volatile, bulk or long-term storage of data or instructions in the computing device 200. The storage 240 may take the form of a magnetic or solid-state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. In some cases, such as those involving solid state memory devices, the memory 220 and storage 240 may be a single device.

The network interface 260 includes an interface to a network such as a network that can be used to communicate calls, signals, streams, arrays, flagged samples and feedback described herein. The network interface 260 may be wired or wireless.

The I/O interface 280 interfaces the processor 210 to peripherals (not shown) such as displays, video and still cameras, microphones, keyboards and USB devices.

In some cases, storage 240 is a non-volatile machine-readable storage medium that includes all types of computer readable media, including magnetic storage media, optical storage media, and solid-state storage media. The software can be installed in the frame slicing and packaging machine 120.

The technologies described herein provide various technological improvements to computer performance and efficiency. For example, the frame slicing and packaging machine 120 has performance enhancements over the prior art that results in more efficient production of an inventory of image products from frames of a digital video work. For example, the technologies described are technological improvements over those of the past because they provide verifiable provenance of images of frames that have been extracted from a motion picture, short video such as a music video, video clip, movie trailer, or individual still photographs. It is believed that there is no mechanism in the prior art to extract individual frames and concurrent with the extract, provide proof of authenticity or provenance of the extracted frames and metadata about the extracted frames.

Figure 5:
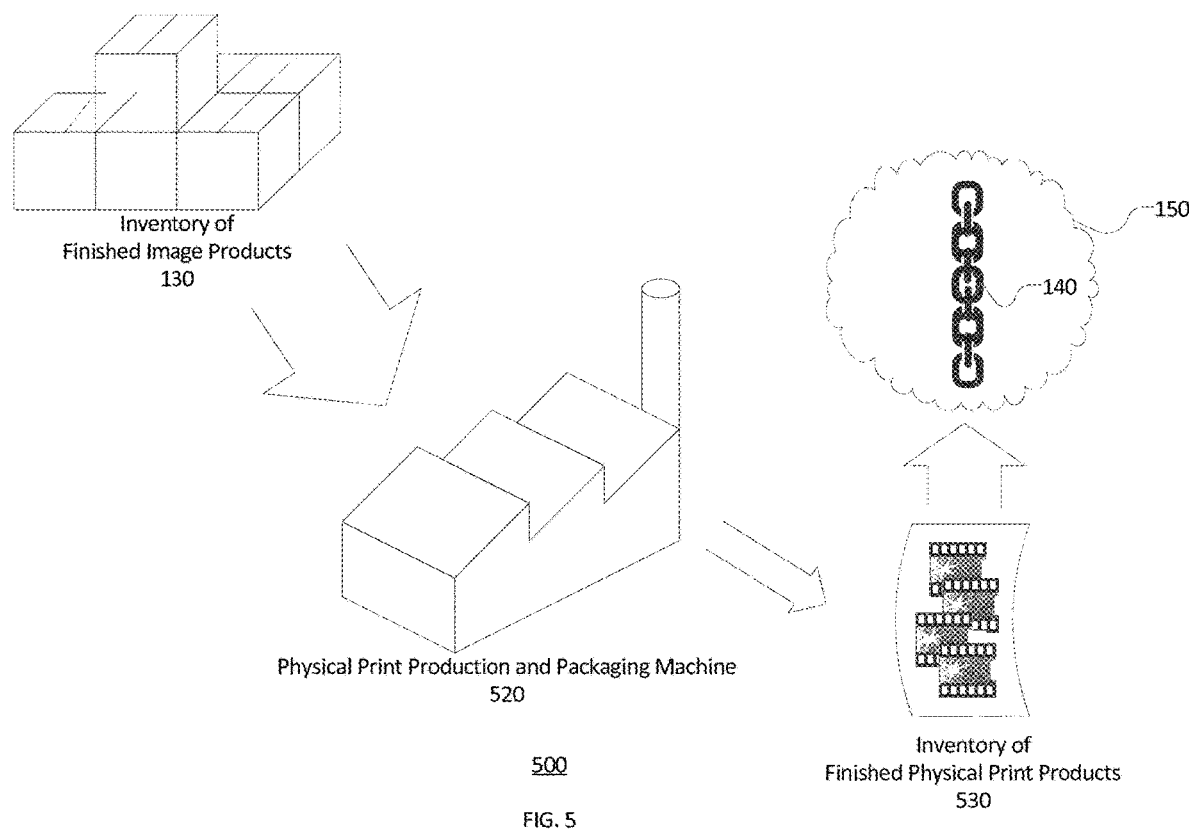
FIG. 5 is a block diagram of a system for production of printed image inventories.

Referring now to FIG. 5 there is shown a block diagram of a system 500 for production of physical print inventories. The system 500 includes one or more finished image product inventory 510 items, a physical print production and packaging machine 520, an inventory of finished physical print products 530, and transaction processing nodes 140.

Figure 6:
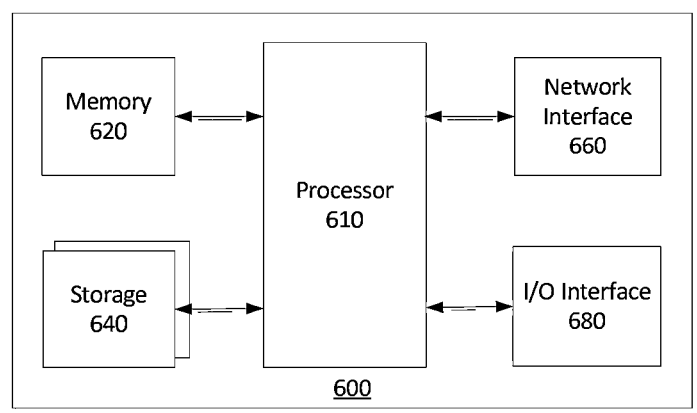
FIG. 6 is a block diagram of a computing device.

The physical print production and packaging machine 520 receives image products from the inventory of finished image products 130, produces the inventory of finished physical print products 530, and moves them into the transaction processing nodes 140. The physical print production and packaging machine 520 may be a computer system, such as shown in FIG. 6, including one or more non-volatile machine-readable media storing a program having instructions which when executed by a processor will cause the processor to produce the inventory of finished image products 530.

Figure 8:
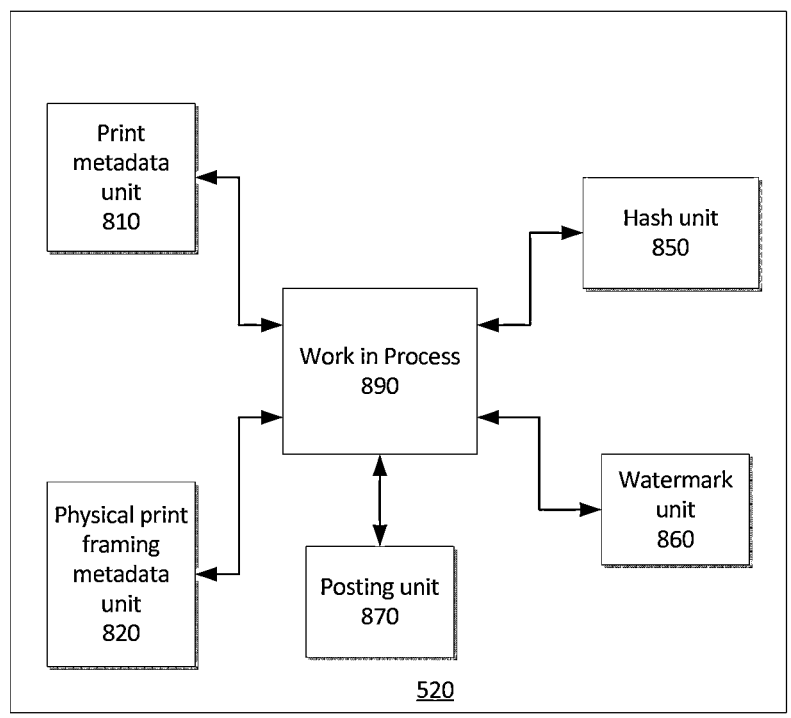
FIG. 8 is a block diagram of a physical print production and packaging machine.

As shown in FIG. 8, the physical print production and packaging machine 520 may include a physical print metadata unit 810, a physical print framing (e.g., the decorative and/or protective device that the physical print is attached to or mounted in) metadata unit 820, a hash unit 850, a watermark unit 860, and a posting unit 870. These units 810, 820, 850, 860, 870 interact with a work in process subsystem 890, which may be storage 640 (FIG. 6). The posting unit 870 may effectuate its work through the I/O interface 680 (FIG. 6).

Each finished print product in the inventory 530 is a chattel good, capable of transfer on an individual basis.

The transaction processing nodes 140 may be in an information technology cloud 150, such as cloud storage. The transaction processing nodes may be in a blockchain.

Description of Processes

Figure 7:
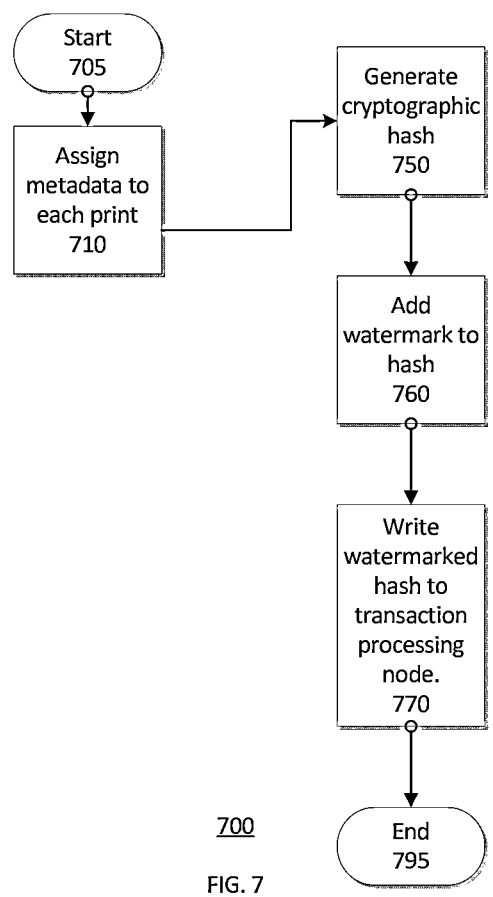
FIG. 7 is a flowchart of a process for production of physical prints from image inventories.

Referring now to FIG. 7 there is shown a flowchart 700 of a process for production of physical prints. The process 700 may be performed by the physical print production and packaging machine 520 of FIG. 5 and FIG. 8, having as inputs the finished image product inventory 510 items, and manufacturing the inventory of finished physical print products 530. The flow chart 700 has both a start 705 and an end 795, but the process is cyclical in nature.

Next, metadata is assigned to each physical print of the digital video work being produced (step 710). This may be performed by the print metadata unit 810. The print metadata may include a copy of the following items: identification of the work, provenance of the work, an identification of the frame within the work, and may include additional new items. The metadata may include: colors in the print; effects or filters added to the print; tags previously assigned to the image frame that describe the frame being printed; package elements of the print such as where an image is split into two or more sub-prints to give a sense of motion; physical substrate material the print is printed on; where a physical frame or other protective holding device is ordered with the print, the material the device is composed of; border material, if any; print protective materials; print and frame protective materials, if any; and hanging system supplied with the print, if any. The provenance of the work may include: the identity of the print production and packaging machine; the geographic location and timestamp where the print was originally produced or subsequently processed; names or other identification of the people, equipment and firms which did the production and processing; language and subtitles; details of how the production and processing were performed; and details of errors and errata from the production and processing. Metadata for a given image frame that is being printed may include a sequence of images from immediate prior and or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for prints of frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; and studio.

Metadata for prints of frames of still images may include: title or identity of the collection or sub-collection of which the image is a part; artist; subject; category; album; session; sequence; session index; sequence index; camera used; and number of photographs in the album, session and or sequence.

Additional frame or object metadata may include: whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Ariz., appearing in the frame; popular or famous objects, such as the Millennium Falcon, appearing in the frame; desired color composition appearing in the frame; quality of preservation or original source media, as whether it is deteriorated or is damaged; and pre-existing value of adjacent segments or frames.

Next, for each frame, a cryptographic hash is generated of the frame's image, the frame metadata, and the object metadata (step 750). This may be performed by the hash unit 850, which encrypts information items about a print along with the digital file of the print itself into a hash value that uniquely identifies the printed image frame and information items about the image frame. Thus, if even a single digital bit is changed in the files of the print and information items about the print that are input into the cryptographic hashing algorithm, the resulting hash value will be completely different from the hash value before the digital bit was changed. The hash unit 850 may produce a hash value from the representation of the print file along with the image frame and object metadata. The hash unit 850 packages the hash value with the corresponding print. This hash value is more efficient and technologically superior to prior art index prints which aim to confirm that an individual print is part of a collection of prints shown in the index print.

The cryptographic hashing of the image from a frame with the metadata is performed to be able to objectively and transparently confirm authenticity of the image and the metadata into the future. This allows reliable chain of title and chain of custody and can support a reliable market for the image.

Next a watermark may be added to the hash (step 760) to protect the linkage of the image file with its hashed value from malicious tampering. This may be performed by the watermark unit 860. The watermark unit 860 packages the watermarked hash value with the corresponding print.

Next, the watermarked hash is written to a node of a transaction processing network (step 770). This may be performed by the posting unit 870 by generating a transaction to register the watermarked hash along with its record provenance into a blockchain. Writing to the node may be under control of a smart contract. The hash values provided by the hash unit 850, or the packages from the watermark unit 860, are recorded by the posting unit 870 into the transaction processing nodes 140, which may be in a secure transaction processing network, distributed ledger or blockchain, or other transaction processing environment. The distributed ledger may be an immutable distributed ledger.

The transaction processing nodes may support queries. Thus, an individual who might want to purchase an image inventory item 130 or a physical print item 530, with the physical print item 530 as a package with a protective or decorative frame, or just the physical print, could make a query to confirm the authenticity of the image. Each hashed package or physical print will have a different hash value—even hashes of the same package or physical print will have different hash values.

FIG. 6 is a block diagram of a computing device 600. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 600 may be representative of the physical print production and packaging machine 520 (FIG. 5). The computing device 600 may include software and/or hardware for providing functionality and features described herein. The computing device 600 may therefore include one or more of: logic arrays, memories, analog circuits, digital circuits, software, firmware and processors. The hardware and firmware components of the computing device 600 may include various specialized units, circuits, software and interfaces for providing the functionality and features described herein. For example, a global positioning system (GPS) receiver or similar hardware may provide location-based services.

The computing device 600 has a processor 610 coupled to a memory 620, storage 640, a network interface 660 and an I/O interface 680. The processor 610 may be or include one or more microprocessors, field programmable gate arrays (FPGAs), application specific integrated circuits (ASICs), programmable logic devices (PLDs) and programmable logic arrays (PLAs).

The memory 620 is a non-transitory storage medium and may be or include RAM, ROM, DRAM, SRAM and MRAM, and may include firmware, such as static data or fixed instructions, BIOS, system functions, configuration data, and other routines used during the operation of the computing device 600 and processor 610. The memory 620 also provides a storage area for data and instructions associated with applications and data handled by the processor 610. As used herein the term memory corresponds to the memory 620 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 640 provides non-volatile, bulk or long-term storage of data or instructions in the computing device 600. The storage 640 may take the form of a magnetic or solid-state disk, tape, CD, DVD, or other reasonably high capacity addressable or serial storage medium. Multiple storage devices may be provided or available to the computing device 600. Some of these storage devices may be external to the computing device 600, such as network storage or cloud-based storage. In some cases, such as those involving solid-state memory devices, the memory 620 and storage 640 may be a single device.

The network interface 660 includes an interface to a network such as a network that can be used to communicate calls, signals, streams, arrays, flagged samples and feedback described herein. The network interface 660 may be wired or wireless.

The 110 interface 680 interfaces the processor 610 to peripherals (not shown) such as displays, video and still cameras, microphones, keyboards and USB devices.

In some cases, storage 640 is a non-volatile machine-readable storage medium that includes all types of computer readable media, including magnetic storage media, optical storage media, and solid-state storage media. The software can be installed in the frame slicing and packaging machine 520.

The technologies described herein provide various technological improvements to computer performance and efficiency. For example, the frame slicing and packaging machine 520 has performance enhancements over the prior art that results in more efficient production of an inventory of image products from frames of a digital video work. For example, the technologies described are technological improvements over those of the past because they provide verifiable provenance of images of frames that have been extracted from a motion picture, short video such as a music video, video clip, movie trailer, or individual still photographs. It is believed that there is no mechanism in the prior art to extract individual frames and concurrent with the extract, provide proof of authenticity or provenance of the extracted frames and metadata about the extracted frames.

Figure 9:
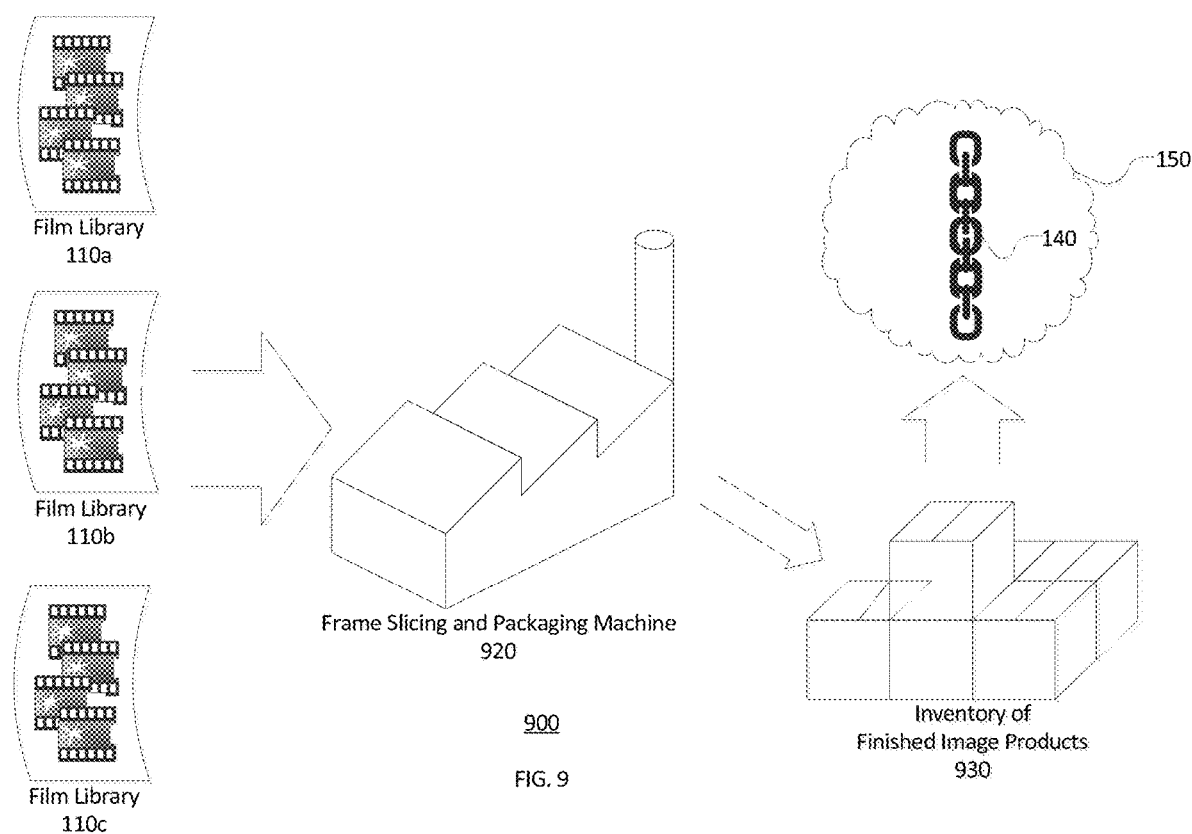
FIG. 9 is a block diagram of a system for production of image inventories.

Referring now to FIG. 9 there is shown a block diagram of a system 900 for production of image inventories. The system 900 includes one or more film libraries 110*a*, 110*b*, 110*c*, a frame slicing and packaging machine 920, an inventory of finished image products 930, and transaction processing nodes 140.

The film libraries 110*a*, 110*b*, 110*c* each includes a collection of one or more whole movies, videos, and/or movie trailers, and/or portions thereof (e.g., clips), each of which is a sequence of frames having a respective still image. These items in a film library will be referred to herein as base works. A base work may be a single frame, i.e., a still image, such as a picture or a drawing, in analog or digital format. The base works may be in analog or digital format, and each film library 110*a*, 110*b*, 110*c* may be exclusive to a particular form or format of base work. Some film libraries may have base works in assorted forms and/or formats, related or unrelated. The frames of a base work may have various objects, such as people, animals, goods or text in a frame. A given frame may include audio and subtitles.

Figure 10:
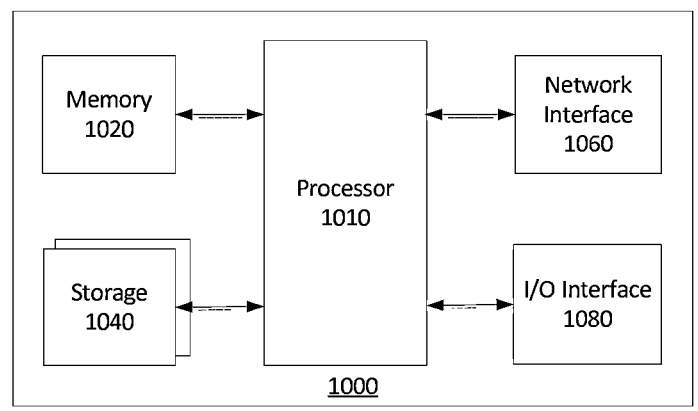
FIG. 10 is a block diagram of a computing device.
Figure 12:
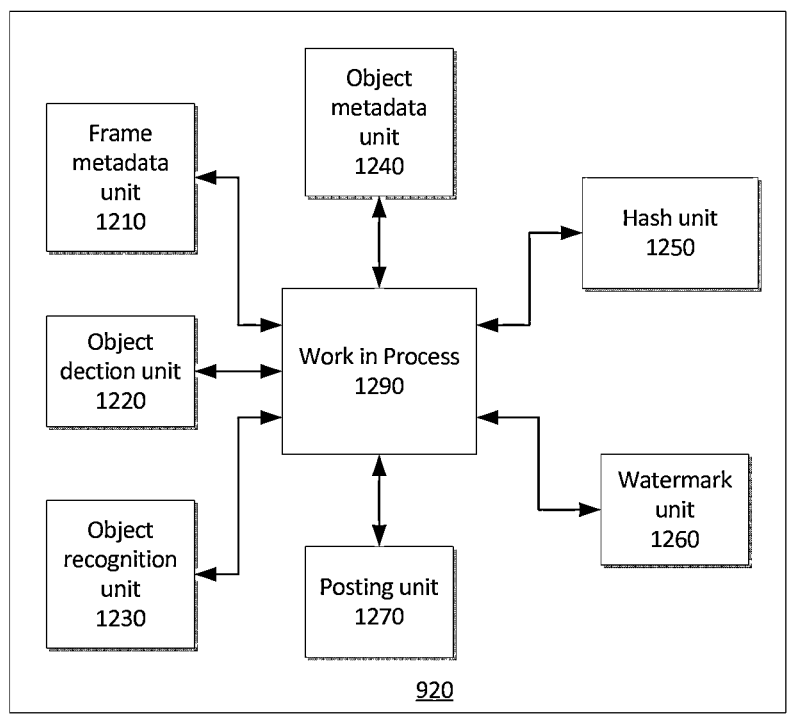
FIG. 12 is a block diagram of a frame slicing and packaging machine.

The frame slicing and packaging machine 920 produces the inventory of finished image products 930 and moves them into the transaction processing nodes 140. The frame slicing and packaging machine 920 may be a computer system, such as shown in FIG. 10, including one or more non-volatile machine-readable media storing a program having instructions which when executed by a processor will cause the processor to produce the inventory of finished image products 930. As shown in FIG. 12, the frame slicing and packaging machine 920 may include a frame metadata unit 1210, an object detection unit 1220, an object recognition unit 1230, an object metadata unit 1240, a hash unit 1250, a watermark unit 1260, a posting unit 1270. These units 1210, 1220, 1230, 1240, 1250, 1260, 1270 interact with a work in process subsystem 1290, which may be the storage 1040 (FIG. 10). The posting unit 1270 may effectuate its work through the I/O interface 1080 (FIG. 10).

Artificial intelligence may be incorporated into or used by the frame metadata unit 1210, the object detection unit 1220, the object recognition unit 1230 and /or the object metadata unit 1240. Accordingly, these units 1210, 1220, 1230, 1240 may be trained to perform the corresponding work prior to going into production. These units 1210, 1220, 1230, 1240 may employ quality assurance, such as use of human checks on samples of the production output, which may be used as feedback for refinement of the training.

Figure 13:
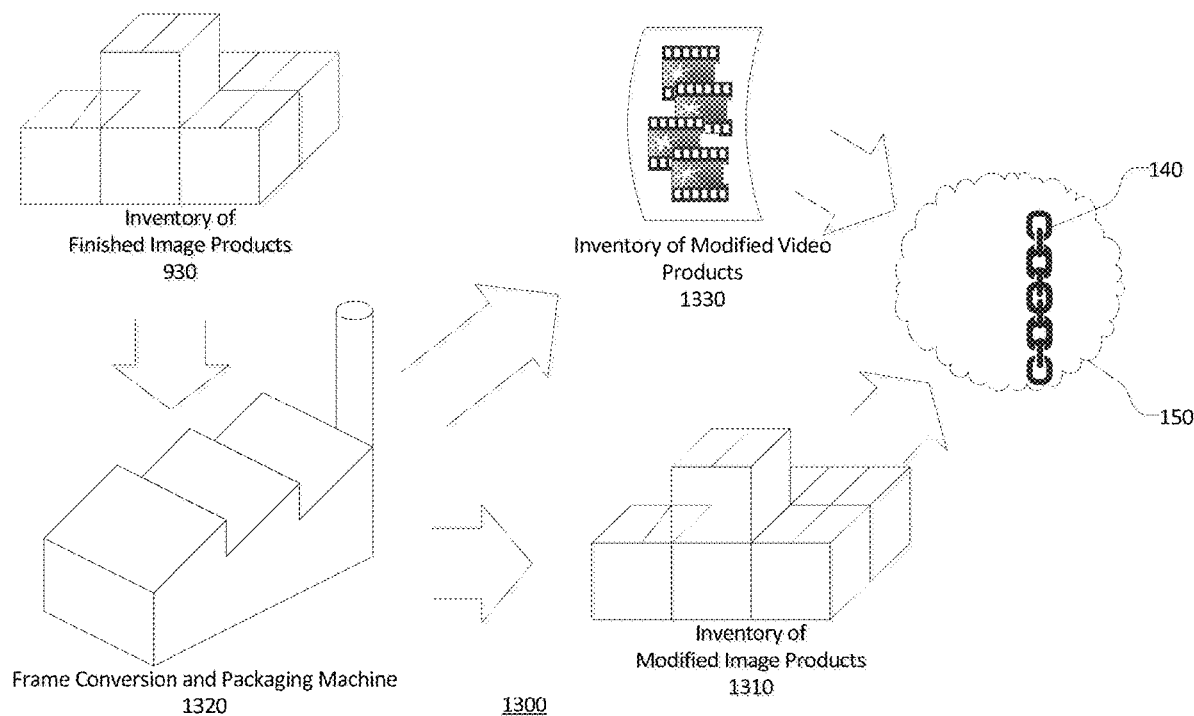
FIG. 13 is a block diagram of a system for production of modified image inventories having an improved image exposure and a monochromatic filter applied to the original images resulting from the system of FIG. 9.
Figure 14:
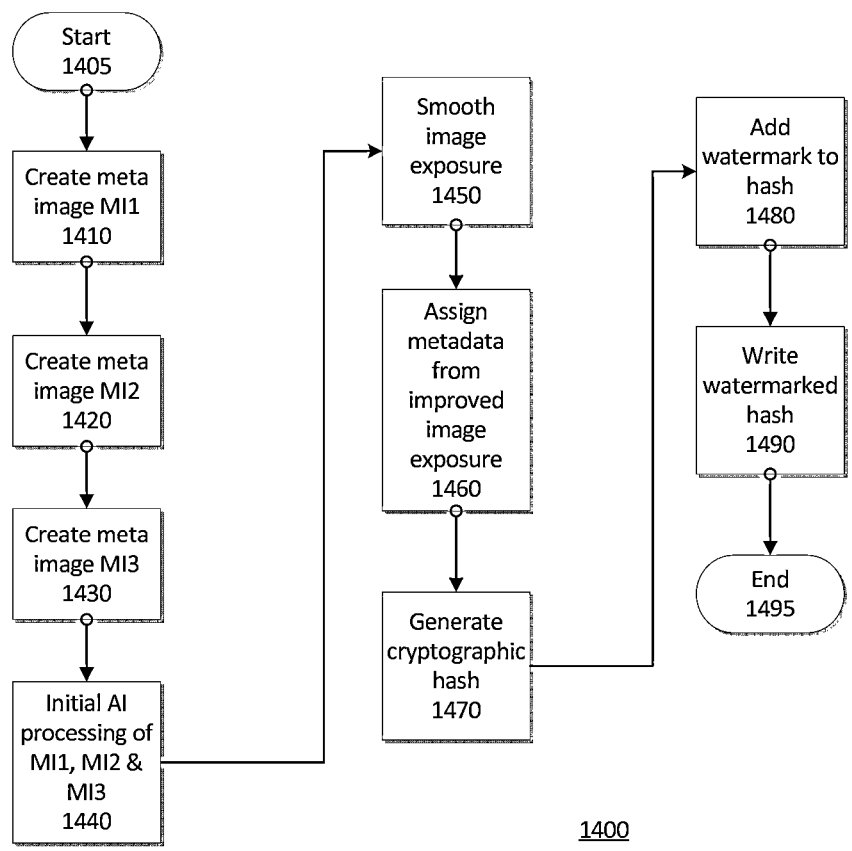
FIG. 14 is a flowchart of a process for production of modified image inventories being processed by artificial intelligence technology to improve the image exposure of the original source images followed by application of a filter to the images with improved exposure.

Referring to FIG. 13 there is shown a block diagram of a system 1300 for production of modified image inventories having the image exposure improved by application of artificial intelligence technology to the inventory of finished image products 930 of FIG. 9. The system 1300 includes one or more finished image products 930, a frame conversion and packaging machine 1320, an inventory of modified derivative video libraries 1330, an inventory of modified derivative image products 1310, and transaction processing nodes 140.

The inventory of finished image products 930 each are processed by artificial intelligence technology to improve the image exposure, whereby the principles of sensitometry are used to train the artificial intelligence algorithms that are applied to improve the image exposure. Upon completion of improvement of image exposure, a monochromatic filter may be applied to the exposure-improved images to further alter the original image format to a new format such as sepia and white, or to improve the image contrast such as by adding a yellow filter to the image, or other artistic alterations to the image such as antiquing, burning, dodging and the like.

Figure 15:
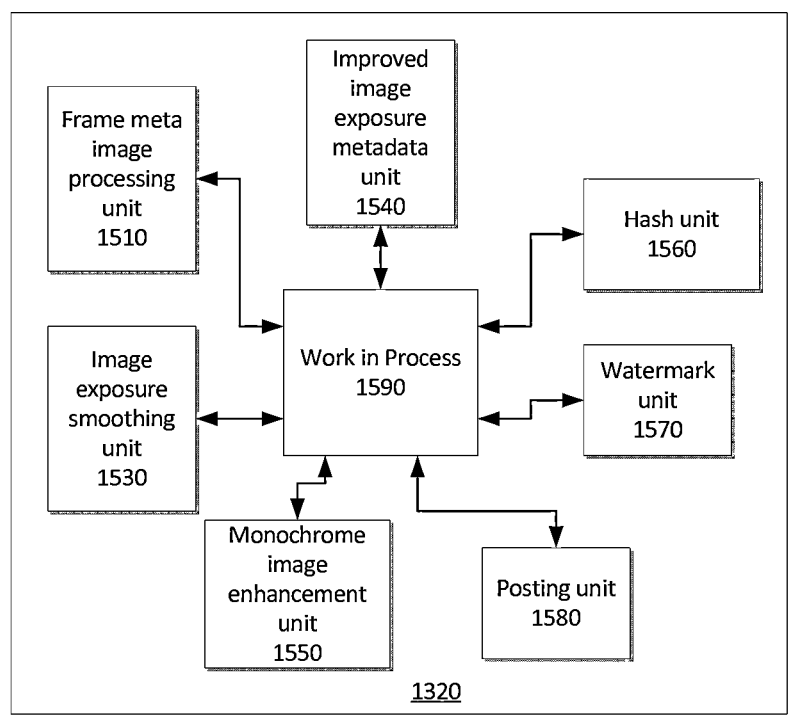
FIG. 15 is a block diagram of a system for production of modified image inventories being processed by artificial intelligence technology to improve the image exposure of the original source image inventories and then apply a monochrome filter to the improved exposure image inventories.
Figure 17:
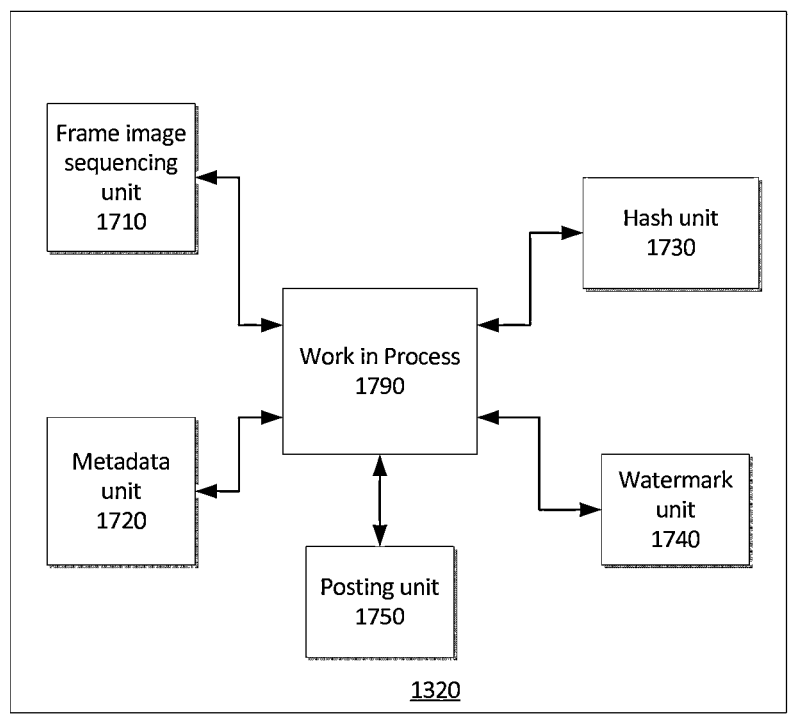
FIG. 17 is a block diagram of a system for assembling modified individual image inventories into derivative movie works.

The frame conversion and packaging machine 1320 produces the inventory of modified image products 1310 and inventory of modified video products 1330 and moves them into the transaction processing nodes 140. The frame conversion and packaging machine 1320 may be a computer system, such as shown in FIG. 10, including one or more non-volatile machine-readable media storing a program having instructions which when executed by a processor will cause the processor to produce the inventory of modified image products 1310 or modified video products 1330. As shown in FIG. 15, the frame conversion and packaging machine 1320 may include a frame meta image processing unit 1510, an image exposure smoothing unit 1530, an improved image exposure metadata unit 1540, a monochrome image enhancement unit 1550, a hash unit 1560, a watermark unit 1570, and a posting unit 1580. These units 1510, 1530, 1540, 1550, 1560, 1570, 1580 interact with a work in process subsystem 1590, which may be the storage 1040 (FIG. 10). The posting unit 1580 may effectuate its work through the I/O interface 1080 (FIG. 10). Alternatively, as shown in FIG. 17, the frame conversion and packaging machine 1320 may include a frame image sequencing unit 1710, a metadata unit 1720, a hash unit 1730, a watermark unit 1740, and a posting unit 1750. These units 1710, 1720, 1730, 1740, 1750 interact with a work in process subsystem 1760, which may be the storage 1040 (FIG. 10). The posting unit 1750 may effectuate its work through the I/O interface 1080 (FIG. 10).

Artificial intelligence may be incorporated into or used by the frame meta image processing unit 1510, the frame image exposure smoothing unit 1530, and/or the improved image exposure metadata unit 1540. Accordingly, these units 1510, 1530, 1540 may be trained to perform the corresponding work prior to going into production. These units 1510, 1530, 1540 may employ quality assurance, such as use of human checks on samples of the production output, which may be used as feedback for refinement of the training.

The inventory of modified image products 1310 can be assembled into a video through use of the metadata attribute of image number. A video can be assembled by organizing a group of converted images according to their relative order through use of the metadata attribute of image number as an organizing index (e.g., image 1 precedes image 2 which is followed by image 3) and the organized converted images are then written to a new derivative video digital media file in the inventory of modified video products1330.

Figure 18:
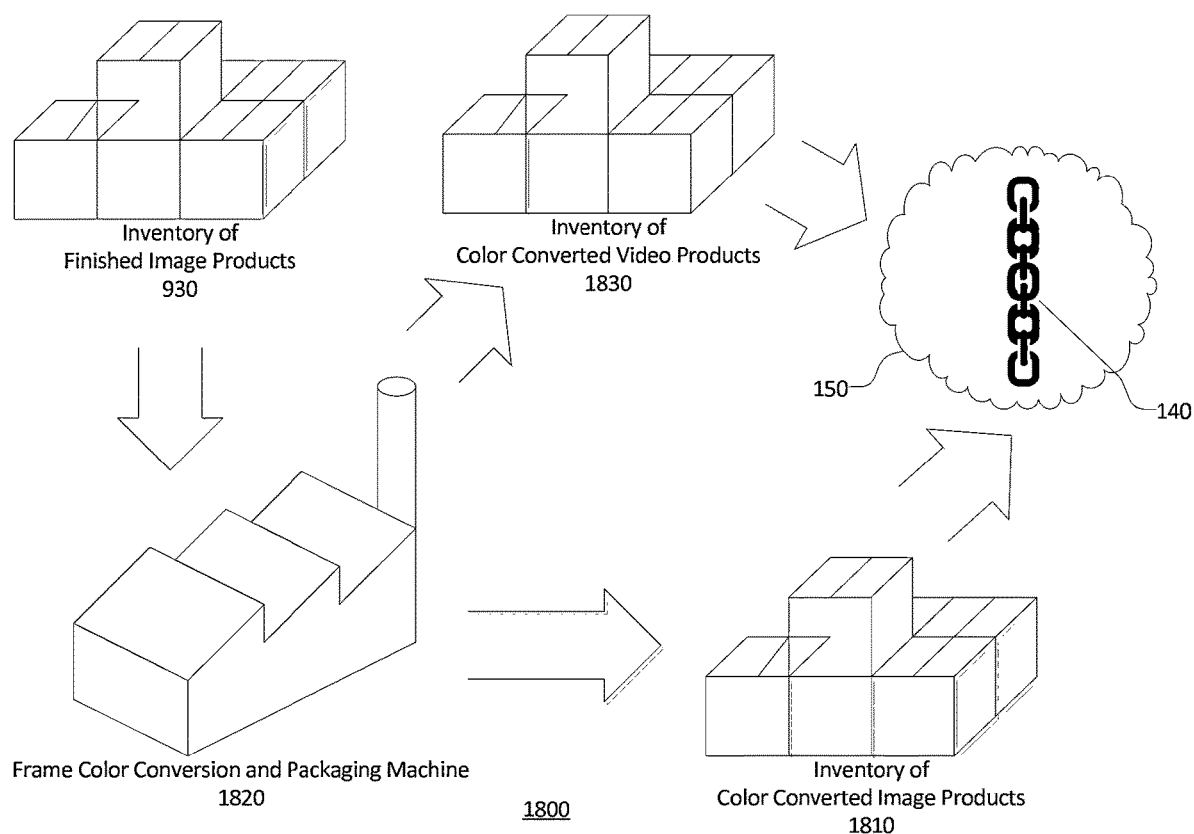
FIG. 18 is a block diagram of a system for production of modified image inventories consisting of black and white images converted to color images.

Referring to FIG. 18 there is shown a block diagram of a system 1800 for production of color-converted image inventories where monochromatic (e.g., black and white) source images are converted to color images by application of artificial intelligence technology to the inventory of finished image products 930 of FIG. 9. The system 1800 includes one or more finished image products 930, a frame color-conversion and packaging machine 1820, an inventory of color-converted derivative video libraries 1830, an inventory of color-converted derivative image products 1810, and transaction processing nodes 140.

The inventory of finished image products 930 each are processed by artificial intelligence technology to convert the source image from black and white to color. In this context, objects in the image are detected, recognized and colored by artificial intelligence technology using algorithms that have been developed through extensive training iterations. The use of artificial intelligence technology to perform the colorization effort can result in significant increases in accuracy of colorized result while realizing a corresponding significant reduction in the time it takes to perform the color-conversion of the source image.

Figure 20:
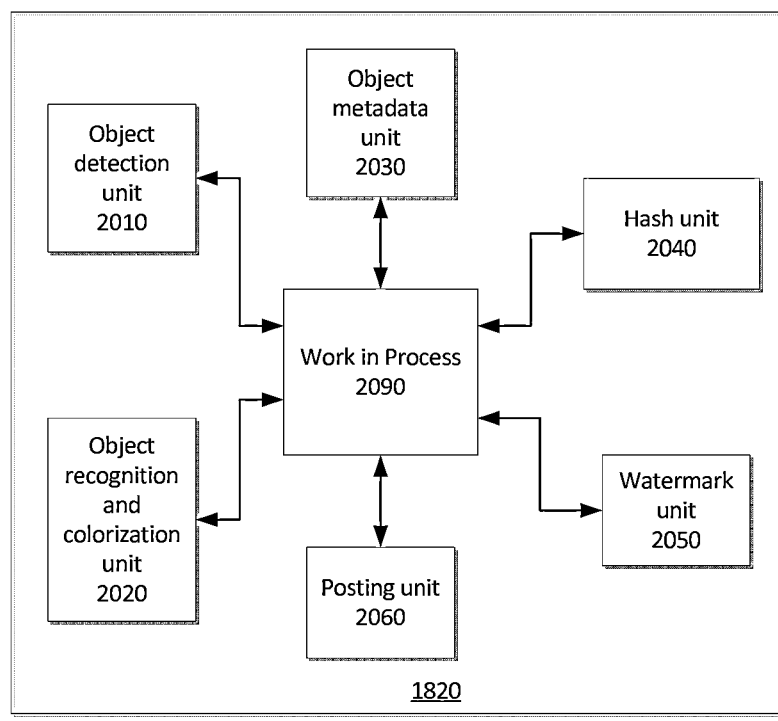
FIG. 20 is a block diagram of a system for production of color-converted image inventories where artificial intelligence technology is used to perform the color-conversion process of converting black and white images to color images.
Figure 22:
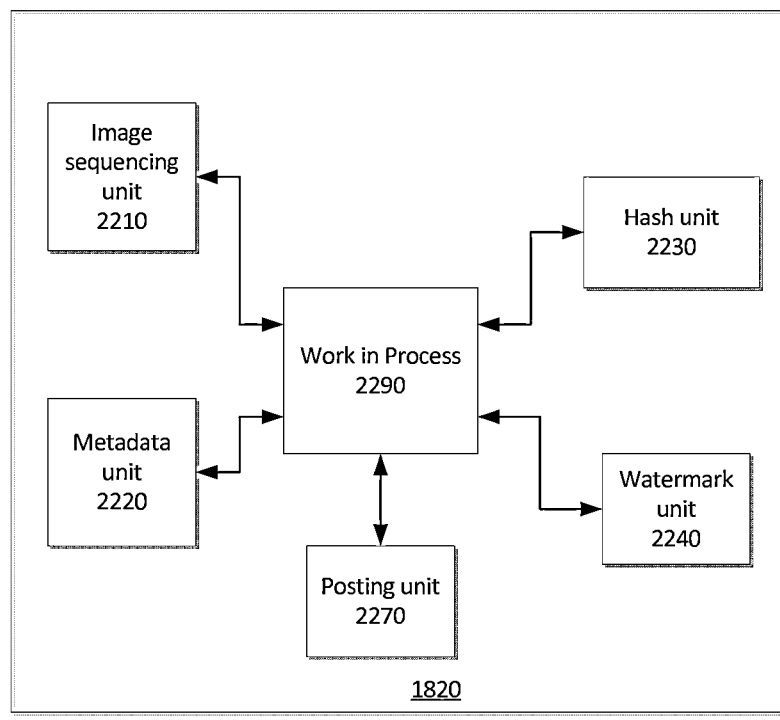
FIG. 22 is a block diagram of a system for assembling color-converted image inventories into derivative movie works.

The frame color-conversion and packaging machine 1820 produces the inventory of color-converted image products 1810 and inventory of color-converted video products 1830 and moves them into the transaction processing nodes 140. The frame color-conversion and packaging machine 1820 may be a computer system, such as shown in FIG. 10, including one or more non-volatile machine-readable media storing a program having instructions which when executed by a processor will cause the processor to produce the inventory of color-converted image products 1810 or color-converted video products 1830. As shown in FIG. 20, the frame color-conversion and packaging machine 1820 may include a frame object detection unit 2010, an object recognition and colorization unit 2020, an object metadata unit 2030, a hash unit 2040, a watermark unit 2050, and a posting unit 2060. These units 2010, 2020, 2030, 2040, 2050, 2060 interact with a work in process subsystem 2090, which may be the storage 1040 (FIG. 10). The posting unit 2060 may effectuate its work through the I/O interface 1080 (FIG. 10). Alternatively, as shown in FIG. 22, the frame color-conversion and packaging machine 1820 may include a color-converted image sequencing unit 2210, a metadata unit 2220, a hash unit 2230, a watermark unit 2240, and a posting unit 2270. These units 2210, 2220, 2230, 2240, 2270 interact with a work in process subsystem 2290, which may be the storage 1040 (FIG. 10). The posting unit 2270 may effectuate its work through the I/O interface 1080 (FIG. 10).

The inventory of color-converted image products 1810 each can be assembled into a video through use of the metadata attribute of image number. A video can be assembled by organizing a group of color-converted images according to their relative order through use of the metadata attribute of image number as an organizing index (e.g., image 1 precedes image 2 which is followed by image 3) and the organized color-converted images are then written to a new derivative video digital media file 1830.

Each finished image product in the inventory 930, 1310, 1330, 1810 and 1830 is a chattel good, capable of transfer on an individual basis.

The transaction processing nodes 140 may be in an information technology cloud 150, such as cloud storage. The transaction processing nodes may be in a blockchain.

Description of Processes

Figure 11:
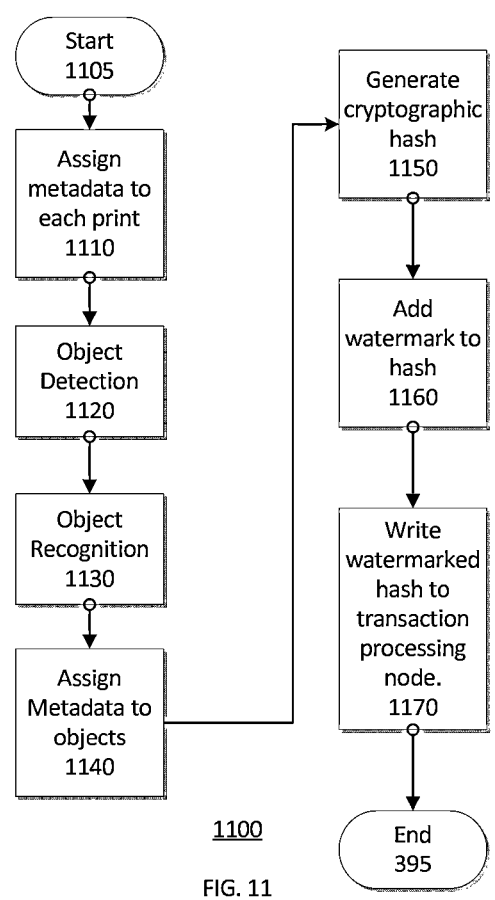
FIG. 11 is a flowchart of a process for production of image inventories.

Referring now to FIG. 11 there is shown a flowchart 1100 of a process for production of image inventories. The process 1100 may be performed by the frame slicing and packaging machine 920 of FIG. 9 and FIG. 12, having as inputs the film libraries 110a, 110b, 110c, etc. and manufacturing the inventory of finished image products 930. The flow chart 1100 has both a start 1105 and an end 1195, but the process is cyclical in nature.

After starting 1105, the process may include some preprocessing. This preprocessing may include extraction of base works from the film libraries into the work in process subsystem 1290, and extraction of frames from a base work. The base work may be on an analog physical medium such as celluloid film, and preprocessing may include scanning the analog film medium into a digital file. If the base work is in analog form it may be converted to digital form. Preprocessing results in the base work, in digital form, being stored in the work in process subsystem 1290.

During preprocessing, a human operator may select which frames should be included or excluded from further processing by the frame slicing and packaging machine. Frame selection criteria may include metadata as described below. The operator may be provided with options for frame selection, such as actors. For example, if the film Butch Cassidy and the Sundance Kid was being preprocessed, the operator could choose to process only the frames having Butch Cassidy (played by Paul Newman), or only the frames showing his face.

Next, metadata is assigned to each frame of the digital video work (step 1110). This may be performed by the frame metadata unit 1210. The frame metadata may include an identification of the work, provenance of the work, an identification of the processor, and an identification of the frame within the work. The metadata may include: colors in the frame; tags previously assigned to the frame that describe the frame; and geographic location represented in the frame. The provenance of the work may include: the identity of the frame slicing and packaging machine; the geographic location and timestamp where the frame was originally produced or subsequently processed; names or other identification of the people, equipment and firms which did the production and processing; language and subtitles; details of how the production and processing were performed; and details of errors and errata from the production and processing. Metadata for a given frame may include a sequence of images from immediate prior and or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; and studio.

Metadata for frames of still images may include: title or identify of the collection or sub-collection of which the image is a part; artist; subject; category; album; session; sequence; session index; sequence index; camera used; and number of photographs in the album, session and or sequence.

Next, objects in each frame are detected (step 1120). This may be performed by the object detection unit 1220. The object detection step may include differentiation from a series of frames, for example using a Kalman filter on the images to recognize objects in motion.

Next, the detected objects are recognized (step 1130). This may be performed by the object recognition unit 1230. These objects may be recognizable generically or with varying specificity. For example, an object may be recognized generically as a person, or as a specific type of person (e.g., adult, child, male, female, star actor, extra), or as a specific person (e.g., Mae West or John F. Kennedy). Recognition of audio objects may include speech to text conversion. Frames may include text objects, such as signs or labels in an image.

Next, metadata is assigned to the recognized objects (step 1140). This may be performed by the object metadata unit 1240. This metadata may include the location in the frame of the object and recognition of the object (i.e., identification of what the object is). The metadata may include an image of the object (e.g., an actor). The metadata of a person may include the actor's name. The metadata for audio objects may include spoken lines and sounds.

The metadata may link objects from within frames or across frames. For example, audio may be linked to the object in the image which produces the audio. In this way lines of dialogue may be linked to the actor speaking the lines. In this way, in Gone with the Wind, Rhett Butler (played by Clark Gable) may be linked to the line, "Frankly, my dear, I don't give a damn." Likewise, recitations of "May the Force be with you" in a Star Wars film may be linked to each actor reciting this line. The sound of a gunshot may be linked to the image of the gun, or to a person struck, such as in the move The Matrix, when Neo (played by Keanu Reeves) is shot.

Additional frame or object metadata may include: whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Arizona, appearing in the frame; popular or famous objects, such as the Millennium Falcon, appearing in the frame; desired color composition appearing in the frame; quality of preservation or original source media, as whether it deteriorated or is damaged; pre-existing value of adjacent segments or frames.

Next, for each frame, a cryptographic hash is generated of the frame's image, the frame metadata, and the object metadata (step 1150). This may be performed by the hash unit 1250, which encrypts information items that uniquely identify a frame into a hash value that uniquely identifies the frame's image and information items about the frame's image. Thus, if even a single digital bit is changed in the files of the frame's image and information items about the frame's image that are input into the cryptographic hashing algorithm, the resulting hash value will be completely different from the hash value before the digital bit was changed. The hash unit 1250 may produce a hash value from the authenticated representation of the image file along with the frame and object metadata. This hash value is more efficient and technologically superior to prior art index prints which aim to confirm that an individual print is part of a collection of prints shown in the index print.

The cryptographic hashing of the image from a frame with the metadata is performed to be able to objectively and transparently confirm authenticity of the image and the metadata into the future. This allows reliable chain of title and chain of custody and can support a reliable market for the image.

Next a watermark may be added to the hash (step 1160) to protect the linkage of the image file with its hashed value from malicious tampering. This may be performed by the watermark unit 1260. The watermarking unit 1260 packages the hash value with the corresponding frame.

Next, the watermarked hash is written to a node of a transaction processing network (step 1170). This may be performed by the posting unit 1270 by generating a transaction to register the watermarked hash along with its record provenance into a blockchain. Writing to the node may occur under control of a smart contract. The hash values provided by the hash unit 1250, or the packages from the watermarking unit 1260, are recorded by the posting unit 1270 into the transaction processing nodes 140, which may be in a secure transaction processing network, distributed ledger or blockchain, or other transaction processing environment. The distributed ledger may be an immutable distributed ledger.

Referring to FIG. 13 there is shown a flowchart 1300 of a process for production of modified image inventories being processed by artificial intelligence technology to improve the image exposure of the original source images followed by optional application of a monochromatic filter to the images that have had their exposure improved. The process 1300 may be performed by the modified image inventory packaging machine 1320 of FIG. 13 and FIG. 15, having as inputs the inventory of finished image products 930 and manufacturing the modified image inventories 1310. The flow chart 1400 has both a start 1405 and an end 1495, but the process is cyclical in nature.

After starting 1405, the process creates meta image files 1410, 1420 and 1430 that are samples of the finished image products 930 with different exposures applied to the image. The process of creating meta image files may include copying the finished image products 930 into the work in process subsystem 1590 of FIG. 15. The set of meta image files is stored in the work in process subsystem 1590.

The next step in the process involves initial artificial intelligence processing of the meta images into a baseline meta image 1440 which is roughly analogous to an average of the exposure values applied to meta images of steps 1410, 1420 and 1430 with no weighting for exposure. The baseline meta image of step 1440 is stored in the work in process subsystem 1590 of FIG. 15.

After the baseline meta image of step 1440 has been created, the artificial intelligence exposure adjustment process moves to an iterative exposure adjustment between the three meta images where a copy of the baseline meta image is shifted between meta image exposure settings until the range of exposures in the image is optimized based on algorithms taught to the artificial intelligence processing subsystem 1450, e.g., to smooth the image exposure. This step can be performed by the image exposure smoothing unit 1530. A further process of application of a monochromatic (e.g., sepia) tint to the optimized-exposure modified image can be processed at this stage by the monochrome image enhancement unit 1550. The resulting optimized-exposure modified image is stored in the work in process subsystem 1590 of FIG. 15.

Next, metadata is assigned to each optimized-exposure modified image. This may be performed by the image metadata unit 1540. The image metadata may include an identification of the range of exposure values that were used in the optimized-exposure modified image. Where a monochromatic tint was applied to the optimized-exposure modified image, the specific tint value would be included in the assigned metadata. The metadata for each optimized-exposure modified image may be stored in a single file, with a CSV, XML or JSON format. The metadata from plural optimized-exposure modified images may be stored in a database, and the database may also include the correlated images.

Next, for each optimized-exposure modified image, a cryptographic hash is generated of the image and image metadata. This may be performed by the hash unit 1560, which encrypts information items that uniquely identify the modified image and image metadata into a hash value that uniquely identifies the modified image and information items about the modified image. Thus, if even a single digital bit is changed in the files of the modified image and information items about the modified image that are input into the cryptographic hashing algorithm, the resulting hash value will be completely different from the hash value before the digital bit was changed. The hash unit 1560 may produce a hash value from the authenticated representation of the optimized-exposure modified image file along with the image metadata. This hash value is more efficient and technologically superior to prior art index prints which aim to confirm that an individual print is part of a collection of prints shown in an index print.

The cryptographic hashing of the modified image with the image metadata is performed to be able to objectively and transparently confirm authenticity of the modified image and the metadata into the future. This allows reliable chain of title and chain of custody and can support a reliable market for the image.

Next, a watermark may be added to the hash (step 1480) to protect the linkage of the image file with its hashed value from malicious tampering. This may be performed by the watermark unit 1570. The watermark unit 1570 packages the hash value with the corresponding image.

Next, the watermarked modified image hash is written to a node of a transaction processing network (step 1490). This may be performed by the posting unit 1580 by generating a transaction to register the watermarked hash along with its record of provenance into a blockchain. Writing to the node may occur under control of a smart contract. The hash values provided by the hash unit 1560, or the packages from the watermark unit 1570, are recorded by the posting unit 1580 into the transaction processing nodes 140, which may be in a secure transaction processing network, distributed ledger or blockchain, or other transaction processing environment. The distributed ledger may be an immutable distributed ledger.

Figure 16:
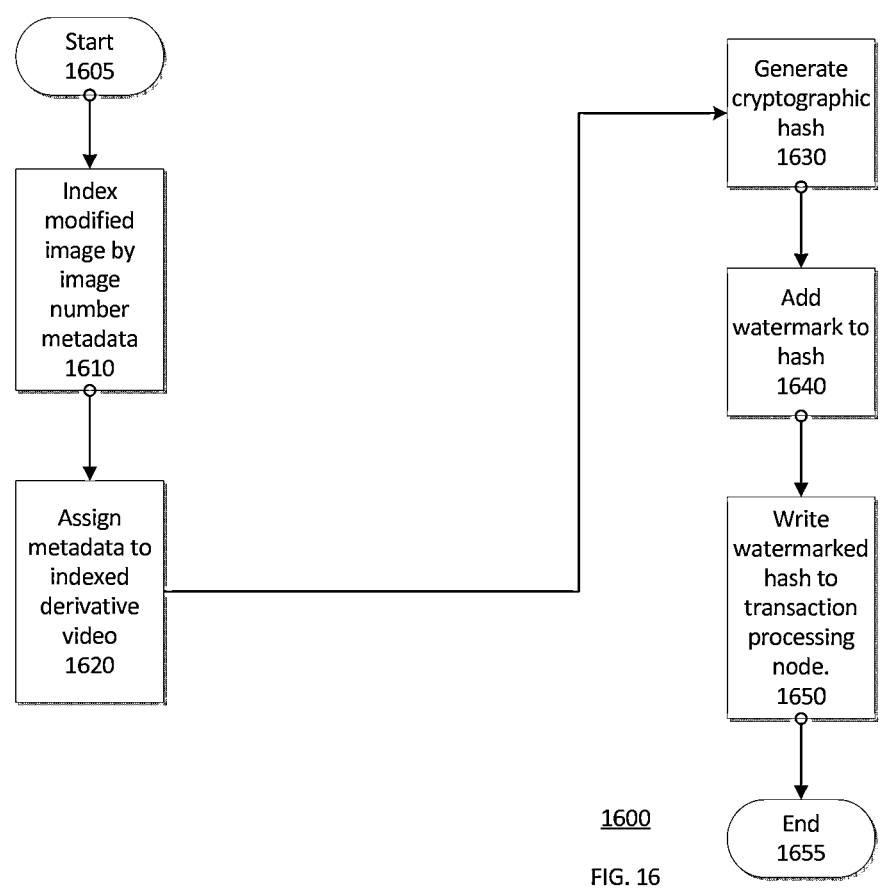
FIG. 16 is a flowchart of a process for assembling modified individual image inventories into derivative movie works.

Referring to FIG. 16 there is shown a flowchart 1600 of a process for production of modified derivative video works having as inputs the modified image inventories 1310 and manufacturing the modified derivative video works 1330. The process 1600 may be performed by the frame conversion and packaging machine 1320 of FIG. 13 and FIG. 17, having as inputs the modified image inventories 1310 and manufacturing the modified derivative video works 1330. The flow chart 1600 has both a start 1605 and an end 1655, but the process is cyclical in nature.

After starting 1605, the process creates an indexed modified image collection by organizing the modified image inventory by image number metadata where image number 1 precedes image number 2, which in turn is followed by image number 3 and so on until the entire modified image collection is sequenced according to image number (step 1610). The process of creating the sequenced modified image collection may include copying the modified image files into the work in process subsystem 1760 of FIG. 17. The set of sequenced modified image files is stored in the work in process subsystem 1760.

Next, metadata is assigned to the sequenced modified images file (step 1620). This may be performed by the metadata unit 1720. The sequenced image collection metadata may include the endorsement of the modified work by the owner of original work's copyright, the range (e.g., 1 through 135,000) of images that have been sequenced into the video, the date and time the sequencing occurred, the location where the sequencing occurred and other items of information relevant to the manufacture of the modified video work. The metadata for each sequenced modified image may be stored in a single file, with a CSV, XML or JSON format. The metadata from plural sequenced modified images may be stored in a database, and the database may also include the correlated images.

Next for each sequenced modified images file, a cryptographic hash is generated of the images and the image metadata (step 1630). This may be performed by the hash unit 1730, which encrypts information items that uniquely identify the sequenced modified images and image metadata into a hash value that uniquely identifies the sequenced modified images and information items about the sequenced modified images. Thus, if even a single digital bit is changed in the files of the sequenced modified images and information items about the sequenced modified images that are input into the cryptographic hashing algorithm, the resulting hash value will be completely different from the hash value before the digital bit was changed. The hash unit 1730 may produce a hash value from the authenticated representation of the sequenced modified images along with the image metadata. This hash value is more efficient and technologically superior to prior art index prints which aim to confirm that an individual print is part of a collection of prints shown in an index print. The cryptographic hashing of the sequenced modified images with the image metadata is performed to be able to objectively and transparently confirm authenticity of the sequence of modified images and the metadata into the future. This allows reliable chain of title and chain of custody and can support a reliable market for the modified movies.

Next, a watermark may be added to the hash (step 1640) to protect the linkage of the sequenced modified image file with its hashed value from malicious tampering. This may be performed by the watermark unit 1740. The watermark unit 1740 packages the hash with the corresponding sequenced modified image file.

Next, the watermarked sequenced modified image hash is written to a node of a transaction processing network (step 1650). This may be performed by the posting unit 1750 by generating a transaction to register the watermarked hash along with its record of provenance into a blockchain. Writing to the node may occur under control of a smart contract. The hash values provided by the hash unit 1730, or the packages from the watermark unit 1740, are recorded by the posting unit 1750 into the transaction processing nodes 140, which may be in a secure transaction processing network, distributed ledger or blockchain, or other transaction processing environment. The distributed ledger may be an immutable distributed ledger.

Figure 19:
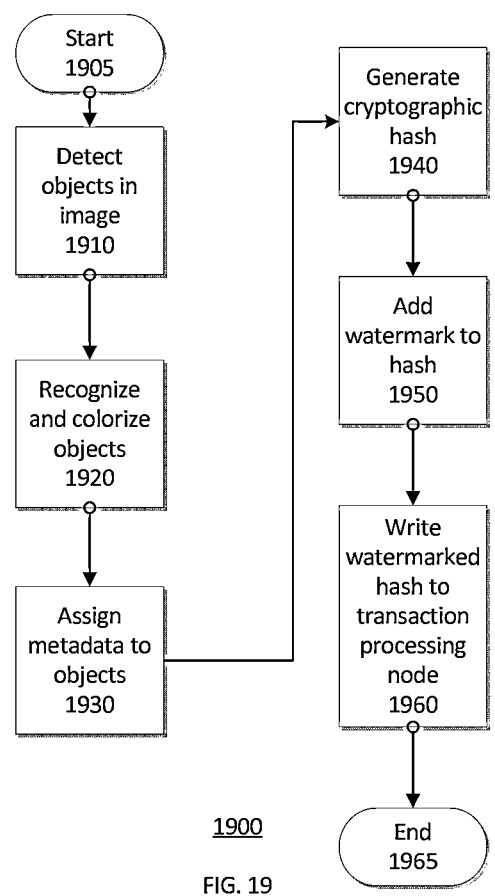
FIG. 19 is a flowchart of a process for conversion of black and white images to color image inventories through the application of artificial intelligence technology to the process of color conversion of the black and white images.

Referring to FIG. 19, there is shown a flowchart 1900 of a process for production of color-converted image inventories being processed by artificial intelligence technology to detect objects in the images, recognize and colorize the objects in the images and assign metadata to the recognized and colorized objects in the images. The process 1900 may be performed by the frame color-conversion and packaging machine 1820 of FIG. 18 and FIG. 20, having as inputs the inventory of finished image products 930 and manufacturing the color-converted image product inventories 1810. The flow chart 1900 has both a start 1905 and an end 1965, but the process is cyclical in nature.

After starting 1905, the process uses artificial intelligence to detect objects in the image 1910. The process of detecting objects may include copying the finished image products 930 into the work in process subsystem 2090 of FIG. 20. The set of detected objects image files are stored in the work in process subsystem 2090.

The next step in the process uses artificial intelligence to recognize and colorize 1920 the objects detected in step 1910, which may be performed by the object recognition and colorization unit 2020. The set of colorized objects that are the result of 1920 performing its processing are stored in the work in process subsystem 2090 of FIG. 20.

Next, metadata is assigned to each colorized image object that was processed by the image color-conversion subsystem. This may be performed by the image metadata unit 2030. The image metadata may include an identification of the images that were detected, the color(s) that were assigned to the detected images and any other actions that were performed by the artificial intelligence technology in processing the color conversion functions. The metadata for each color converted image may be stored in a single file, with a CSV, XML or JSON format. The metadata from plural color-converted images may be stored in a database, and the database may also include the correlated images.

Next, for each color-converted image, a cryptographic hash is generated of the image and image metadata (step 1940). This may be performed by the hash unit 2040, which encrypts information items that uniquely identifies the color-converted image and image metadata into a hash value. Thus, if even a single digital bit is changed in the files of the color-converted image and image metadata that are input into the cryptographic hashing algorithm, the resulting hash value will be completely different from the hash value before the digital bit was changed. The hash unit 2040 may produce a hash value from the authenticated representation of the color-converted image file along with the image metadata. This hash value is more efficient and technologically superior to prior art index prints which aim to confirm that an individual print is part of a collection of prints shown in an index print.

The cryptographic hashing of the color-converted image with the image metadata is performed to be able to objectively and transparently confirm authenticity of the modified image and the metadata into the future. This allows reliable chain of title and chain of custody and can support a reliable market for the image.

Next, a watermark may be added to the hash (step 1950) to protect the linkage of the image file with its hashed value from malicious tampering. This may be performed by the watermark unit 2050. The watermark unit 2050 packages the hash value with the corresponding image.

Next, the watermarked color-converted image is written to a node of a transaction processing network (step 1960). This may be performed by the posting unit 2060 by generating a transaction to register the watermarked hash along with its record of provenance into a blockchain.

Writing to the node may occur under control of a smart contract. The hash values provided by the hash unit 2040, or the packages from the watermark unit 2050, are recorded by the posting unit 2060 into the transaction processing nodes 140, which may be in a secure transaction processing network, distributed ledger or blockchain or other transaction processing environment. The distributed ledger may be an immutable distributed ledger.

Figure 21:
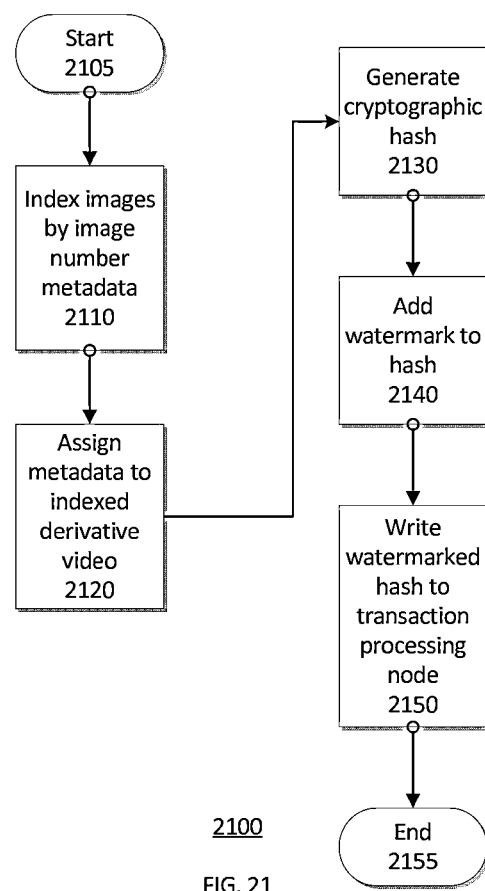
FIG. 21 is a flowchart of a process for assembling color-converted image inventories into derivative movie works.

Referring to FIG. 21 there is shown a flowchart 2100 of a process for production of color-converted video works having as inputs the color-converted image inventories 1810 and manufacturing the color-converted derivative video works 1830. The process 2100 may be performed by the color-conversion and packaging machine 1820 of FIG. 18 and FIG. 20, having as inputs the color-converted image inventories 1810 and manufacturing the color-converted derivative video works 1830. The flow chart 2100 has both a start 2105 and an end 2155, but the process is cyclical in nature.

After starting 2105, the process creates an indexed image collection by organizing the color-converted image inventory by image number metadata where image number 1 precedes image number 2, which in turn is followed by image number 3 and so on until the entire color-converted image collection is sequenced according to image number (step 2110). The process of creating the sequenced color-converted image collection may include copying the color-converted image files into the work in process subsystem 2290 of FIG. 22. The set of sequenced color-converted image files is stored in the work in process subsystem 2290.

Next, metadata is assigned to the sequenced color-converted images file (step 2120). This may be performed by the metadata unit 2220. The sequenced image collection metadata may include the endorsement of the color-converted work by the owner of the original work's copyright, the range (e.g., 1 through 135,000) of images that have been sequenced into the video, the date and time the sequencing occurred, the location where the sequencing occurred and other items of information relevant to the manufacture of the color-converted video work. The metadata or each sequenced color-converted image may be stored in a single file, with a CSV, XML or JSON format. The metadata from plural sequenced color-converted images may be stored in a database, and the database may also include the correlated images.

Next for each sequenced color-converted images file, a cryptographic hash is generated of the images and the image metadata (step 2130). This may be performed by the hash unit 2230, which encrypts information items that uniquely identify the sequenced color-converted images and image metadata into a hash value. Thus, if even a single digital bit is changed in the files of the print and information items about the sequenced color-converted images and image metadata that are input into the cryptographic hashing algorithm, the resulting hash value will be completely different from the hash value before the digital bit was changed. The hash unit 2230 may produce a hash value from the authenticated representation of the sequenced color-converted images along with the image metadata. This hash value is more efficient and technologically superior to prior art index prints which aim to confirm that an individual print is part of a collection of prints shown in an index print. The cryptographic hashing of the sequenced color-converted images with the image metadata is performed to be able to objectively and transparently confirm authenticity of the sequence of color-converted images and the metadata into the future. This allows reliable chain of title and chain of custody and can support a reliable market for the color-converted movies.

Next, a watermark may be added to the hash (step 2140) to protect the linkage of the sequenced color-converted image file with its hashed value from malicious tampering. This may be performed by the watermark unit 2240. The watermark unit 2240 packages the hash with the corresponding sequenced color-converted image file.

Next, the watermarked sequenced color-converted image hash is written to a node of a transaction processing network (step 2150). This may be performed by the posting unit 2270 by generating a transaction to register the watermarked hash along with its record of provenance into a blockchain. Writing to the node may occur under control of a smart contract. The hash values provided by the hash unit 2230, or the packages from the watermark 2240, are recorded by the posting unit 2270 into the transaction processing nodes 140, which may be in a secure transaction processing network, distributed ledger or blockchain or other transaction processing environment. The distributed ledger may be an immutable distributed ledger.

The transaction processing nodes may support queries. Thus, an individual who might want to purchase an image could make a query to confirm the authenticity of the image.

FIG. 10 is a block diagram of a computing device 1000. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 1000 may be representative of the frame slicing and packaging machine 920 (FIG. 9), the frame conversion and packaging machine 1320, and/or the frame conversion and packaging machine 1820. The computing device 1000 may include software and/or hardware for providing functionality and features described herein. The computing device 1000 may therefore include one or more of: logic arrays, memories, analog circuits, digital circuits, software, firmware and processors. The hardware and firmware components of the computing device 1000 may include various specialized units, circuits, software and interfaces for providing the functionality and features described herein. For example, a global positioning system (GPS) receiver or similar hardware may provide location-based services.

The computing device 1000 has a processor 1010 coupled to a memory 1020, storage 1040, a network interface 1060 and an I/O interface 1080. The processor 1010 may be or include one or more microprocessors, field programmable gate arrays (FPGAs), application specific integrated circuits (ASICs), programmable logic devices (PLDs) and programmable logic arrays (PLAs).

The memory 1020 is a non-transitory storage medium and may be or include RAM, ROM, DRAM, SRAM and MRAM, and may include firmware, such as static data or fixed instructions, BIOS, system functions, configuration data, and other routines used during the operation of the computing device 1000 and processor 1010. The memory 1020 also provides a storage area for data and instructions associated with applications and data handled by the processor 1010. As used herein the term memory corresponds to the memory 1020 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 1040 provides non-volatile, bulk or long-term storage of data or instructions in the computing device 1000. The storage 1040 may take the form of a magnetic or solid-state disk, tape, CD, DVD, or other reasonably high capacity addressable or serial storage medium. Multiple storage devices may be provided or available to the computing device 1000. Some of these storage devices may be external to the computing device 1000, such as network storage or cloud-based storage. In some cases, such as those involving solid-state memory devices, the memory 1020 and storage 1040 may be a single device.

The network interface 1060 includes an interface to a network such as a network that can be used to communicate calls, signals, streams, arrays, flagged samples and feedback described herein. The network interface 1060 may be wired or wireless.

The I/O interface 1080 interfaces the processor 1010 to peripherals (not shown) such as displays, video and still cameras, microphones, keyboards and USB devices.

In some cases, storage 1040 is a non-volatile machine-readable storage medium that includes all types of computer readable media, including magnetic storage media, optical storage media, and solid-state storage media. It should be understood that the software can be installed in the frame slicing and packaging machine 920.

The technologies described herein provide various technological improvements to computer performance and efficiency. For example, the frame slicing and packaging machine 920 has performance enhancements over the prior art that results in more efficient production of an inventory of image products from frames of a digital video work. For example, the technologies described are technological improvements over those of the past because they provide verifiable provenance of images of frames that have been extracted from a motion picture, short video such as a music video, video clip, movie trailer, or individual still photographs. It is believed that there is no mechanism in the prior art to extract individual frames and concurrent with the extract, provide proof of authenticity or provenance of the extracted frames and metadata about the extracted frames.

Figure 23:
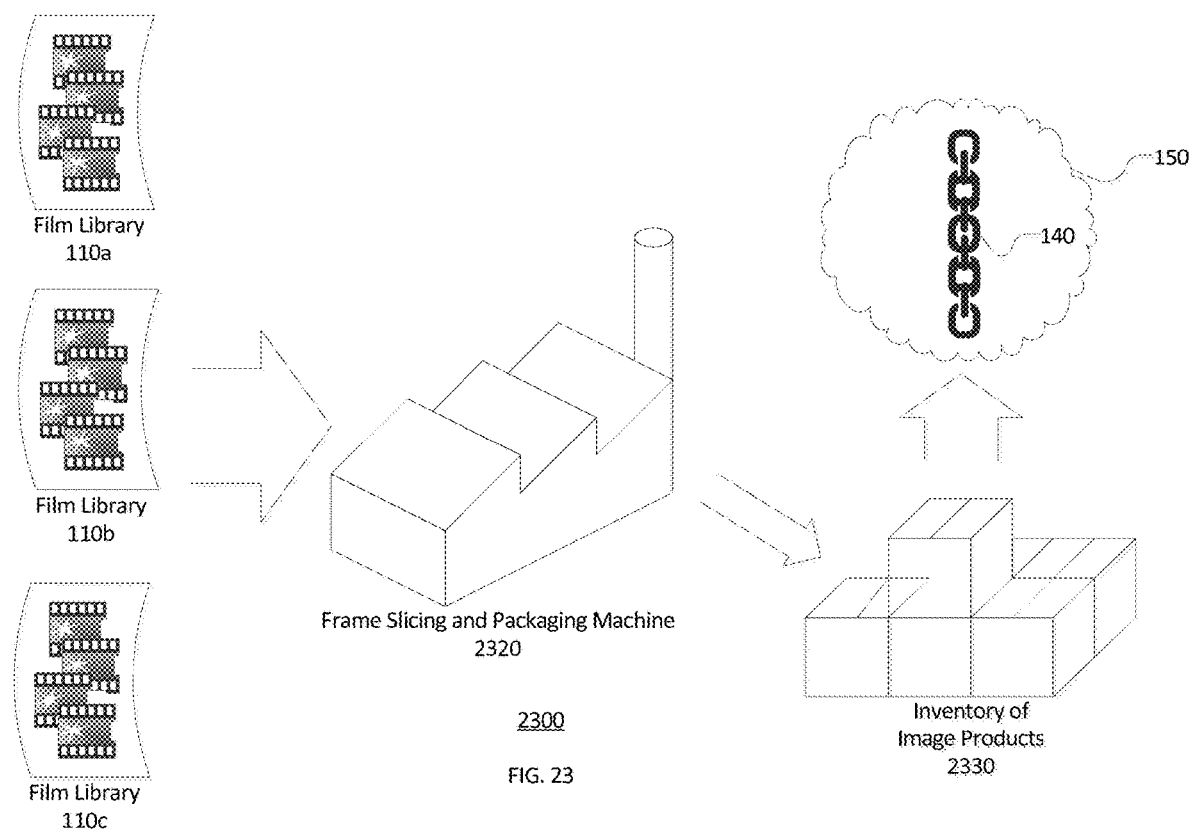
FIG. 23 is a block diagram of a system for production of inventories of image products.

Referring now to FIG. 23 there is shown a block diagram of a system 2300 for production of inventories of image products. The system 2300 includes one or more film libraries 110*a*, 110*b*, 110*c*, a frame slicing and packaging machine 2320, an inventory of image products 2330, and one or more transaction processing nodes 140.

The film libraries 110*a*, 110*b*, 110*c* each include a collection of one or more whole movies, videos, and/or movie trailers, and/or portions thereof (e.g., clips), each of which is a sequence of frames having a respective still image. These items in a film library will be referred to herein as a base work. A base work may be a single frame, i.e., a still image, such as a picture or a drawing, in analog or digital format. The base works may be in analog or digital format, and each film library 110*a*, 110*b*, 110*c* may be exclusive to a particular form or format of base work. Some film libraries may have base works in assorted forms and/or formats, related or unrelated. The frames of a base work may have various objects, such as people, animals, goods, physical structures or text in a frame. A given frame may include audio and subtitles.

Figure 24:
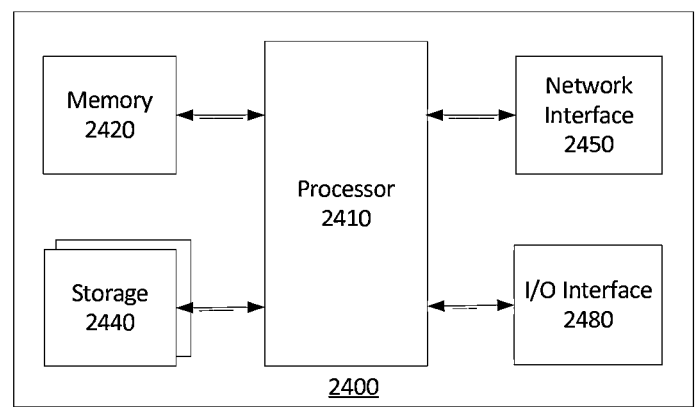
FIG. 24 is a block diagram of a computing device.
Figure 26:
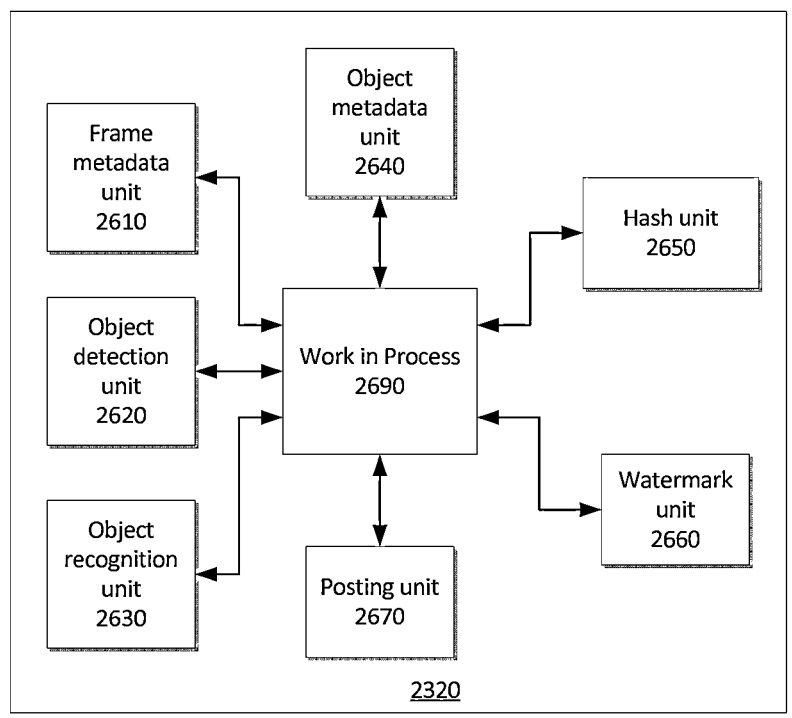
FIG. 26 is a block diagram of a frame slicing and packaging machine.

The frame slicing and packaging machine 2320 produces the inventory of image products 2330 and moves them into the transaction processing nodes 140. The frame slicing and packaging machine 2320 may be a computer system, such as shown in FIG. 24, including one or more non-volatile machine-readable media storing a program having instructions which when executed by a processor will cause the processor to produce the inventory of image products 2330. As shown in FIG. 26, the frame slicing and packaging machine 2320 may include a frame metadata unit 2610, an object detection unit 2620, an object recognition unit 2630, an object metadata unit 2640, a hash unit 2650, a watermark unit 2660, a posting unit 2670. These units 2610, 2620, 2630, 2640, 2650, 2660, 2670 interact with a work in process subsystem 2690, which may be the storage 2440 (FIG. 24). The posting unit 2670 may effectuate its work through the I/O interface 2480 (FIG. 24).

Artificial intelligence may be incorporated into or used by the frame metadata unit 2610, the object detection unit 2620, the object recognition unit 2630 and/or the object metadata unit 2640. Accordingly, these units 2610, 2620, 2630, 2640 may be trained to perform the corresponding work prior to going into production. These units 2610, 2620, 2630, 2640 may employ quality assurance, such as use of human checks on samples of the production output, which may be used as feedback for refinement of the training.

Each image product in the inventory 2330 is a chattel good, capable of transfer on an individual basis.

The transaction processing nodes 140 may be in an information technology cloud 150, such as cloud storage. The transaction processing nodes 140 may be in a blockchain.

Figure 25:
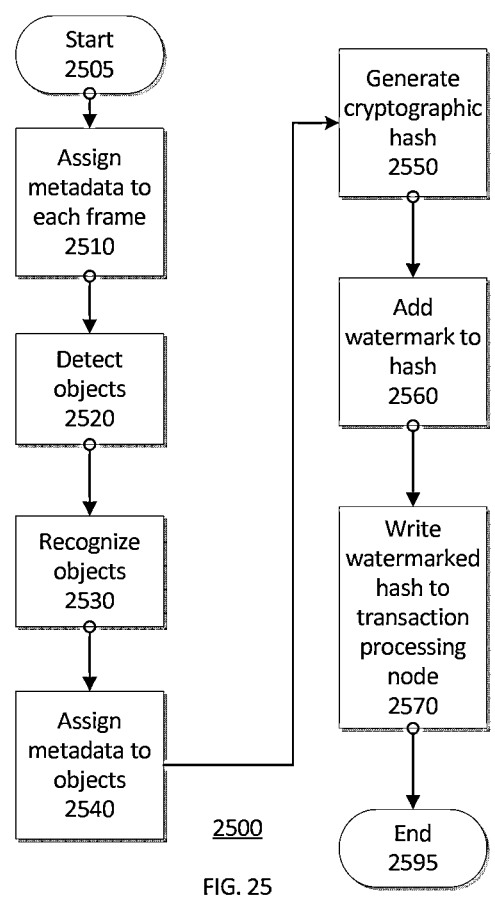
FIG. 25 is a flowchart of a process for production of inventories of image products.

Referring now to FIG. 25 there is shown a flowchart 2500 of a process for production of image inventories. The process 2500 may be performed by the frame slicing and packaging machine 2320 of FIG. 23 and FIG. 26, having as inputs the film libraries 110*a*, 110*b*, 110*c*, etc. and manufacturing the inventory of image products 2330. The flow chart 2500 has both a start 2505 and an end 2595, but the process is cyclical in nature.

After starting 2505, the process may include some preprocessing. This preprocessing may include extraction of base works from the film libraries into the work in process subsystem 2690, and extraction of frames from a base work. The base work may be on an analog physical medium such as celluloid film, and preprocessing may include scanning the analog film medium into a digital file. If the base work is in analog form it may be converted to digital form. Preprocessing results in the base work, in digital form, being stored in the work in process subsystem 2690.

During preprocessing, a human operator may select which frames should be included or excluded from further processing by the frame slicing and packaging machine. Frame selection criteria may include metadata about the frames. The operator may be provided with options for frame selection, such as actors. For example, if the film Butch Cassidy and the Sundance Kid was being preprocessed, the operator could choose to process only the frames having video and/or audio of Butch Cassidy (played by Paul Newman), or only the frames showing his face.

Next, metadata is assigned to each frame of the digital video work (step 2510). This may be performed by the frame metadata unit 2610. The frame metadata may include an identification of the work, provenance of the work, an identification of the processor, and an identification of the frame within the work. The metadata may include: colors in the frame; tags previously assigned to the frame that describe the frame; and geographic location represented in the frame. The provenance of the work may include: the identity of the frame slicing and packaging machine; the geographic location and timestamp where the frame was originally produced or subsequently processed; names or other identification of the people, equipment and firms which did the production and processing; language and subtitles; details of how the production and processing were performed; and details of errors and errata from the production and processing. Metadata for a given frame may include a sequence of images from immediate prior and or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; and/or studio.

Metadata for frames of still images may include: title or identity of the collection or sub-collection of which the image is a part; artist; subject; category; album; session; sequence; session index; sequence index; camera used; and number of photographs in the album, session and/or sequence.

Next, objects in each frame are detected (step 2520). This may be performed by the object detection unit 2620. The object detection step may include differentiation from a series of frames, for example using a Kalman filter on the images to recognize objects in motion.

Next, the detected objects are recognized (step 2530). This may be performed by the object recognition unit 2630. These objects may be recognizable generically or with varying specificity. For example, an object may be recognized generically as a person, or as a specific type of person (e.g., adult, child, male, female, star actor, extra), or as a specific person (e.g., Mae West or John F. Kennedy). Recognition of audio objects may include speech to text conversion. Frames may include text objects, such as signs or labels in an image.

Next, metadata is assigned to the recognized objects (step 2540). This may be performed by the object metadata unit 2640. This metadata may include the location in the frame of the object and recognition of the object (i.e., identification of what the object is). The metadata may include an image of the object (e.g., an actor). The metadata of a person may include the actor's name. The metadata for audio objects may include spoken lines and sounds.

The metadata may link objects from within frames or across frames. For example, audio may be linked to the object in the image which produces the audio. In this way lines of dialogue may be linked to the actor speaking the lines. In this way, in Gone with the Wind, Rhett Butler (played by Clark Gable) may be linked to the line, "Frankly, my dear, I don't give a damn." Likewise, recitations of "May the Force be with you" in a Star Wars film may be linked to each actor reciting this line. Or, the sound of a gunshot may be linked to the image of the gun, or to a person struck, such as in the movie The Matrix, when Neo (played by Keanu Reeves) is shot.

Additional frame or object metadata may include: whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Ariz., appearing in the frame; popular or famous objects, such as the Millennium Falcon, appearing in the frame; desired color composition appearing in the frame; quality of preservation or original source media, as whether it is deteriorated or is damaged; and/or pre-existing value of adjacent segments or frames.

Next, for each frame, a cryptographic hash is generated of the frame's image, the frame metadata, and the object metadata to produce the image product (step 2550). This may be performed by the hash unit 2650, which encrypts information items about a frame along with the frame itself into a hash value that uniquely identifies the frame and information items about the frame. Thus, if even a single digital bit is changed in the files of the frame and information items about the frame that are input into the cryptographic hashing algorithm, the resulting hash value will be completely different from the hash value before the digital bit was changed. The hash unit 2650 may produce a hash value from the representation of the image file along with the frame and object metadata. This hash value is more efficient and technologically superior to prior art index prints which aim to confirm that an individual print is part of a collection of prints shown in the index print.

The cryptographic hashing of the image from a frame with the metadata is performed to be able to objectively and transparently confirm authenticity of the image and the metadata into the future. This allows reliable chain of title and chain of custody tracking and can support a reliable market for the image.

Next a watermark may be added to the hash (step 2560) to protect the linkage of the image file with its hashed value from malicious tampering. This may be performed by the watermark unit 2660. The watermark unit 2660 packages the hash value with the corresponding frame.

Next, the image product (i.e., the hash without the watermark) is written to a node of a transaction processing network (step 2570). This may be performed by the posting unit 2670 by generating a transaction to register the watermarked hash along with its record provenance into a blockchain. Writing to the node may be under control of a smart contract. The hash values provided by the hash unit 2650, or the packages from the watermark unit 2660, are recorded by the posting unit 2670 into the transaction processing nodes 140, which may be in a secure transaction processing network, distributed ledger or blockchain, or other transaction processing environment. The distributed ledger may be an immutable distributed ledger.

The image products, as stored into nodes in the transaction processing network, have images which are exactly the same as the base works. However, after an image product has been produced and saved to the transaction processing node 140, it may be desirable to modify the image's appearance. That is, it may be desirable to produce a new image product in which the image is a derivative of an image in an existing image product. As used herein, an image is a derivative if its appearance is dominated by the appearance of the (prior) image from which it was derived. The derivative is either a transformation, modification or adaptation of the prior image. The new image product may likewise be saved to a transaction processing node. Because the basis of the new image product is an existing image product, the image in the existing image product may be a base work or itself a derivative.

Figure 27:
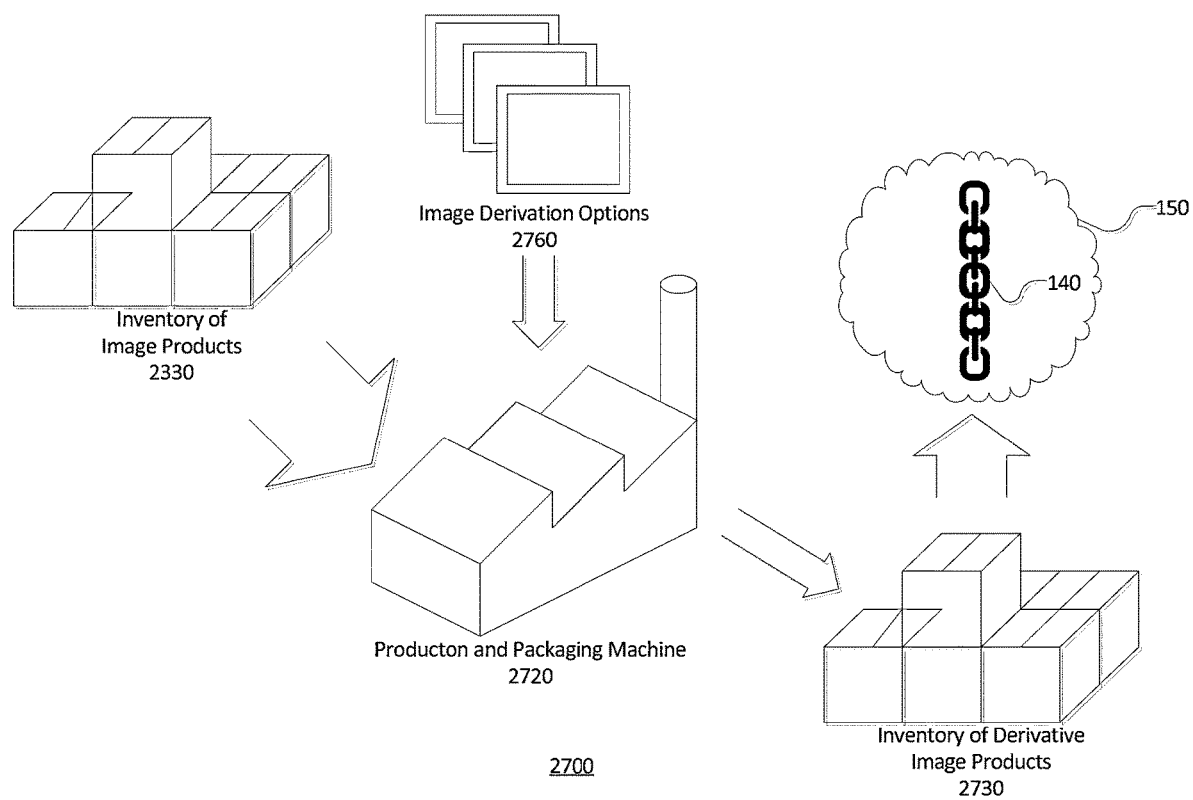
FIG. 27 is a block diagram of a system for production of derivative image products.

Referring now to FIG. 27, there is shown a block diagram of a system 2700 for production of derivative image inventories. The system 2700 includes one or more image product inventories 2330, an inventory of derivation options 2760, a production and packaging machine 2720, an inventory of derivative image products 2730, and transaction processing nodes 140.

The inventory of derivation options 2760 may include a number of categories: mats, borders (akin to a physical frame around a physical painting), edits and filters. Each category may include a number of options. Options may be inclusive or exclusive, and exclusivity may be as to certain options, options having certain characteristics, or all options.

As with physical framed art, mat treatments can be applied between the border and the image. All elements of physical mat products such as colorization, textures, line treatments, coatings and the like can be applied. Further, different mats can be specified for a given image based on external criteria such as seasons, duration of sunlight or other localized environmental considerations. Three-dimensional effects can be replicated by the introduction of a shadowed treatment between the image and the mat to give a sense of the image being mounted above the mat surface.

Borders can have all of the attributes of physical frames. Different materials such as resin and varieties of woods, such as cherry, oak, walnut, bamboo and the like, can be digitally represented. Frame treatments such as antiquing, patina enhancement, high gloss, semi-gloss, matte and other finishes, bleaching and similar effects can be represented in the image. As with mats, different border types and sizes can be specified for a given image based on external criteria, such as seasons, duration (or absence) of sunlight or other localized environmental considerations.

Edits may include cropping, resizing, zooming, dodging, burning and rotating. Cropping typically is performed to remove objectionable content from an image, while resizing is used to 'fit' an image that has been cropped into a desired size. Zooming is generally used to emphasize a particular image element or elements. Dodging and burning are generally used to emphasize or de-emphasize image elements. Variations on the dodging and burning can be used with color images to keep one or more desired features colorized, while converting the remainder of the image into a black and white scheme. Rotation of an image can be used to make images that were taken in one orientation (e.g., portrait or landscape) and present them in another orientation to better fit in with surrounding physical constraints, such as available wall space or to fit on an easel of a certain size.

Antiquing or other filters can be applied to the surface texture captured in the image of the matte border that is being added to the underlying digital image. Overlays can be applied to give a sense of three-dimensional treatment or to produce a limited dodging or burning effect which in turn can serve to emphasize or diminish an image element.

Note that multiple image enhancements (such as two or more borders that can consist of different color borders, different matte materials or textures, different virtual frame materials and different monochromatic treatment that can be applied to the respective image enhancements) can be added together into a combined enhanced image product. The multiple image enhancements can be displayed individually under programmatic control (e.g., cherry wood virtual frame plus beige linen surface matte border for a period of thirty days and then a new combination such as walnut wood virtual frame plus pink smooth surface matte border for a period of fifteen days with further combinations being able to be defined by the owner of the high-resolution video display technology device), or they can be randomly presented on the high-resolution video display device. All of these enhancements can be identified through metadata attributes that are attached to the metadata file that is created for the underlying digital image.

The production and packaging machine 2720 produces the inventory of derivative image products 2730 and moves them into the transaction processing nodes 140. The production and packaging machine 2720 may be a computer system, such as shown in FIG. 24, including one or more non-volatile machine-readable media storing a program having instructions which when executed by a processor will cause the processor to produce the inventory of derivative image products 2730.

Figure 29:
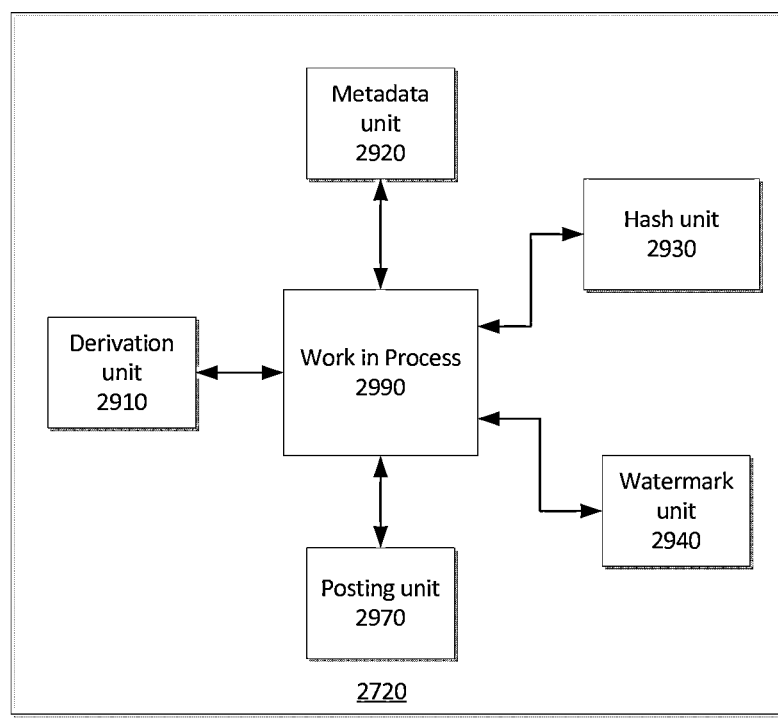
FIG. 29 is a block diagram of a production and packaging machine.

As shown in FIG. 29, the production and packaging machine 2720 may include a derivation unit 2910, a metadata unit 2920, a hash unit 2930, a watermark unit 2940, and a posting unit 2970. These units 2910, 2920, 2930, 2940, 2970 interact with a work in process subsystem 2990, which may be the storage 2440 (FIG. 24). The posting unit 2970 may effectuate its work through the I/O interface 2480 (FIG. 24).

Each derivative image product in the inventory 2330 is a chattel good, capable of transfer on an individual basis.

The transaction processing nodes 140 may be the same or different from those in FIG. 23, and may be in the same or a different information technology cloud 150. The transaction processing nodes may be in a blockchain.

Figure 28:
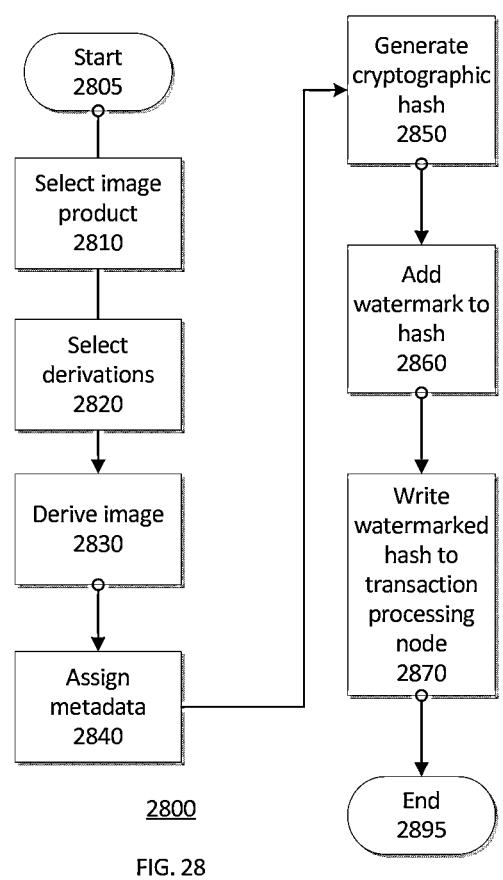
FIG. 28. is a flowchart of a process for production of derivative image products.

Referring now to FIG. 28 there is shown a flowchart 2800 of a process for production of derivative image products. The process 2800 may be performed by the production and packaging machine 2720 of FIG. 27, having as inputs image products 2330 and manufacturing the inventory of derivative image products 2730. The flow chart 2800 has both a start 2805 and an end 2895, but the process is cyclical in nature.

After starting 2805, image products may be selected from the inventory 2330 for derivation or for exclusion from further processing by the production and packaging machine 2720 (step 2810). Selection may be by a human operator and/or automated. The operator may be provided with options for selection of image products, such as actors.

A human operator may also select derivations to be applied to the selected image products (step 2820). For example, different border wood treatments (e.g., cherry, walnut, oak and bamboo) could be selected for a given border. Based on season, one border wood treatment (cherry, walnut, oak, or bamboo) would be displayed with the image. As the season changed, the border wood selection would likewise change.

The derivations are then applied to the image (step 2830). Derivations are included in the combined image file and each particular derivation would be displayed under local application software program control. This may be performed by the derivation unit 2910.

Next, metadata relating to the derivation is assigned to the derivative image (step 2840). This may be performed by the metadata unit 2920. The metadata may include one or more metadata items from the un-derivative still image. New items of metadata may define or identify the derivations and provenance. The provenance of the work may include: the identity of the production and packaging machine; the geographic location and timestamp of the derivation(s); names or other identification of the people, equipment and firms which did the derivation production and processing; language and subtitles apart from those in the underlying image; details of how the production and processing were performed; and details of errors and errata from the production and processing. The metadata for each frame may be stored in a single file, with a CSV, XML or JSON format.

Next, a cryptographic hash is generated of the derivative image, the underlying image metadata, and the derivative image metadata (step 2850). This may be performed by the hash unit 2930, which encrypts information items about a derivative image along with the digital file of the derivative image itself into a hash value that uniquely identifies the derivative image and information items about the derivative image. Thus, if even a single digital bit is changed in the files of the derivative image and information items about the derivative image that are input into the cryptographic hashing algorithm, the resulting hash value will be completely different from the hash value before the digital bit was changed. The hash unit 2930 may produce a hash value from the representation of the derivative image file along with the metadata. The hash unit 2930 packages the hash value with the corresponding derivative image.

The cryptographic hashing of the derivative image is performed to be able to objectively and transparently confirm authenticity of the derivative image and the metadata into the future. This allows reliable chain of title and chain of custody and can support a reliable market for the derivative image.

Next a watermark may be added to the hash (step 2860) to protect the linkage of the derivative image file with its hashed value from malicious tampering. This may be performed by the watermark unit 2940. The watermark unit 2940 packages the watermarked hash value with the corresponding derivative digital image.

Next, the watermarked hash is written to a node of a transaction processing network (step 2870). This may be performed by the posting unit 2970 by generating a transaction to register the watermarked hash along with its record provenance into a blockchain. Writing to the node may be under control of a smart contract. The hash values provided by the hash unit 2930, or the packages from the watermark unit 2940, are recorded by the posting unit 2970 into the transaction processing nodes 140, which may be in a secure transaction processing network, distributed ledger or blockchain, or other transaction processing environment. The distributed ledger may be an immutable distributed ledger.

The transaction processing nodes may support queries. Thus, an individual who might want to purchase an image product or a derivative image product, could make a query to confirm its authenticity.

FIG. 24 is a block diagram of a computing device 2400. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 2400 may be representative of the frame slicing and packaging machine 2320 (FIG. 23) and the production and packaging machine 2720 (FIG. 27). The computing device 2400 may include software and/or hardware for providing functionality and features described herein. The computing device 2400 may therefore include one or more of: logic arrays, memories, analog circuits, digital circuits, software, firmware and processors. The hardware and firmware components of the computing device 2400 may include various specialized units, circuits, software and interfaces for providing the functionality and features described herein. For example, a global positioning system (GPS) receiver or similar hardware may provide location-based services.

The computing device 2400 has a processor 2410 coupled to a memory 2420, storage 2440, a network interface 2460 and an I/O interface 2480. The processor 2410 may be or include one or more microprocessors, field programmable gate arrays (FPGAs), application specific integrated circuits (ASICs), programmable logic devices (PLDs) and programmable logic arrays (PLAs).

The memory 2420 is a non-transitory storage medium and may be or include RAM, ROM, DRAM, SRAM and MRAM, and may include firmware, such as static data or fixed instructions, BIOS, system functions, configuration data, and other routines used during the operation of the computing device 2400 and processor 2410. The memory 2420 also provides a storage area for data and instructions associated with applications and data handled by the processor 2410. As used herein the term memory corresponds to the memory 2420 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 2440 provides non-volatile, bulk or long-term storage of data or instructions in the computing device 2320 and 2720. The storage 2440 may take the form of a magnetic or solid-state disk, tape, CD, DVD, or other reasonably high capacity addressable or serial storage medium. Multiple storage devices may be provided or available to the computing device 2400. Some of these storage devices may be external to the computing device 2400, such as network storage or cloud-based storage. In some cases, such as those involving solid-state memory devices, the memory 2420 and storage 2440 may be a single device.

The network interface 2460 includes an interface to a network such as a network that can be used to communicate calls, signals, streams, arrays, flagged samples and feedback described herein. The network interface 2460 may be wired or wireless.

The I/O interface 2480 interfaces the processor 2410 to peripherals (not shown) such as displays, video and still cameras, microphones, keyboards and USB devices.

In some cases, storage 2440 is a non-volatile machine-readable storage medium that includes all types of computer readable media, including magnetic storage media, optical storage media, and solid-state storage media. The software can be installed in the frame slicing and packaging machine 2320.

The technologies described herein provide various technological improvements to computer performance and efficiency. For example, the frame slicing and packaging machine 2320 has performance enhancements over the prior art that results in more efficient production of an inventory of image products from frames of a digital video work. For example, the technologies described are technological improvements over those of the past because they provide verifiable provenance of images of frames that have been extracted from a motion picture, short video such as a music video, video clip, movie trailer, or individual still photographs. It is believed that there is no mechanism in the prior art to extract individual frames and concurrent with the extract, provide proof of authenticity or provenance of the extracted frames and metadata about the extracted frames.

Within this description, the terms engine or machine means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed synthesis. The synthesis may be performed automatically using a synthesis tool. The gate netlist or other physical description may be further converted into programming code for implementing the engine in a programmable device such as PLD, FPGA or PLA. The gate netlist or other physical description may be converted into process instructions and masks for fabricating the engine within an ASIC.

Some technologies described for the frame slicing and packaging machines 120 and/or the computing device 200 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

Some technologies described for the physical print production and packaging machine 520 and/or the computing device 600 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

Some technologies described for the frame slicing and packaging machine 920 and/or the computing device 1000 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

Some technologies described for the frame slicing and packaging machine 2320, enhanced image production and packaging machine 2720 and/or the computing device 2400 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

Closing Comments

Throughout this description, the embodiments and examples shown should be considered as exemplars, rather than limitations on the apparatus and procedures disclosed or claimed. Although many of the examples presented herein involve specific combinations of method acts or system elements, those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a non-volatile machine-readable device storing a program having instructions which when executed by a processor will cause the processor to manufacture an inventory of image products comprising NFTs from frames of a digital video work, each frame comprising a still image in sequence in the work, the digital video work including audio which corresponds to objects in the still images in the digital video work from which the audio is produced, the process comprising:
   assigning frame metadata to a selected plurality of frames from a base work comprising a motion picture comprising a plurality of sequenced frames, each frame comprising an image, the frame metadata including an identification of the base work and a provenance of the base work;
   for each selected frame, generating at least one cryptographic hash of the image and the frame metadata, wherein the at least one cryptographic hash comprises a plurality of cryptographic hashes, wherein one of the plurality of cryptographic hashes is associated with the image and another of the plurality of cryptographic hashes is associated with the frame metadata; and
   writing the cryptographic hash to a node of a transaction processing network.

2. The apparatus of claim 1 wherein the digital video is a movie in a film library.

3. The apparatus of claim 2 wherein the frame metadata further includes an identification of the frame within the movie.

4. The apparatus of claim 1 wherein the at least one cryptographic hash is an individual file, such that there is one file produced for each print of the image from the base work.

5. The apparatus of claim 1 further comprising adding a watermark to the cryptographic hash before it is written to the node.

6. The apparatus of claim 1 wherein frame includes a name of an actor appearing in the frame.

7. The apparatus of claim 1 wherein the frame metadata includes at least one of a person, an animal or a good recognized in the frame.

8. The apparatus of claim 1 wherein the frame metadata includes color compositions within the frame.

9. The apparatus of claim 1 wherein the frame metadata includes tags describing at least one of the image content, a geographic location where the image was recorded, and a geographic location of where the image content is represented to be.

10. The apparatus of claim 1 wherein the transaction processing network is a blockchain ledger.

11. A process for manufacturing an inventory of image products comprising NFTs from frames of a digital video work, each frame comprising a still image in sequence in the work, the digital video work including audio which corresponds to objects in the still images in the digital video work from which the audio is produced, the process comprising:
   assigning frame metadata to a selected plurality of frames from a base work comprising a motion picture comprising a plurality of sequenced frames, each frame comprising an image, the frame metadata including an identification of the base work and a provenance of the base work;
   for each selected frame, generating at least one cryptographic hash of the image and the frame metadata, wherein the at least one cryptographic hash comprises a plurality of cryptographic hashes, wherein one of the plurality of cryptographic hashes is associated with the image and another of the plurality of cryptographic hashes is associated with the frame metadata; and
   writing the cryptographic hash to a node of a transaction processing network.

12. The method of claim 11 wherein the digital video is a movie in a film library.

13. The method of claim 12 wherein the frame metadata further includes an identification of the frame within the movie.

14. The method of claim 11 wherein the at least one cryptographic hash is an individual file, such that there is one file produced for each print of the image from the base work.

15. The method of claim 11 further comprising adding a watermark to the cryptographic hash before it is written to the node.

16. The method of claim 11 wherein frame includes a name of an actor appearing in the frame.

17. The method of claim 11 wherein the frame metadata includes at least one of a person, an animal or a good recognized in the frame.

18. The method of claim 11 wherein the frame metadata includes color compositions within the frame.

19. The method of claim 11 wherein the frame metadata includes tags describing at least one of the image content, a geographic location where the image was recorded, and a geographic location of where the image content is represented to be.

20. The method of claim 11 wherein the transaction processing network is a blockchain ledger.

* * * * *